US011610122B2

(12) United States Patent
Karras et al.

(10) Patent No.: US 11,610,122 B2
(45) Date of Patent: *Mar. 21, 2023

(54) GENERATIVE ADVERSARIAL NEURAL NETWORK ASSISTED RECONSTRUCTION

(71) Applicant: NVIDIA Corporation, Santa Clara, CA (US)

(72) Inventors: Tero Tapani Karras, Helsinki (FI);
Samuli Matias Laine, Vantaa (FI);
David Patrick Luebke, Charlottesville, VA (US); Jaakko T. Lehtinen, Helsinki (FI); Miika Samuli Aittala, Helsinki (FI); Timo Oskari Aila, Tuusula (FI);
Ming-Yu Liu, San Jose, CA (US);
Arun Mohanray Mallya, San Jose, CA (US); Ting-Chun Wang, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/143,608

(22) Filed: Jan. 7, 2021

(65) Prior Publication Data
US 2021/0150354 A1 May 20, 2021

Related U.S. Application Data

(63) Continuation of application No. 17/069,478, filed on Oct. 13, 2020, and a continuation of application No.
(Continued)

(51) Int. Cl.
*G06T 9/00* (2006.01)
*G06N 3/08* (2023.01)
(Continued)

(52) U.S. Cl.
CPC ............... *G06N 3/08* (2013.01); *G06T 5/003* (2013.01); *G06T 7/73* (2017.01); *G06T 9/002* (2013.01);
(Continued)

(58) Field of Classification Search
CPC ................... G06N 3/08; G06V 40/168; G06T 2207/20084; G06T 2207/20081;
(Continued)

(56) References Cited

U.S. PATENT DOCUMENTS 10,542,267 B2 * 1/2020 Cook .................. H04N 19/157
2018/0357514 A1 12/2018 Zisimopoulos et al.
(Continued)

OTHER PUBLICATIONS

Achille, A., et al., "On the emergence of invariance and disentangling in deep representations," CoRR, Journal of Machine Learning Research 19(2018) 1-34.
(Continued)

*Primary Examiner* — Tuan H Nguyen
(74) *Attorney, Agent, or Firm* — Leydig, Voit & Mayer, Ltd.

(57) ABSTRACT

A latent code defined in an input space is processed by the mapping neural network to produce an intermediate latent code defined in an intermediate latent space. The intermediate latent code may be used as appearance vector that is processed by the synthesis neural network to generate an image. The appearance vector is a compressed encoding of data, such as video frames including a person's face, audio, and other data. Captured images may be converted into appearance vectors at a local device and transmitted to a remote device using much less bandwidth compared with transmitting the captured images. A synthesis neural network at the remote device reconstructs the images for display.

20 Claims, 25 Drawing Sheets

Related U.S. Application Data

17/069,449, filed on Oct. 13, 2020, which is a continuation-in-part of application No. 16/418,317, filed on May 21, 2019, now Pat. No. 11,455,790, said application No. 17/069,478 is a continuation-in-part of application No. 16/418,317, filed on May 21, 2019, now Pat. No. 11,455,790.

(60) Provisional application No. 63/010,511, filed on Apr. 15, 2020, provisional application No. 62/767,985, filed on Nov. 15, 2018, provisional application No. 62/767,417, filed on Nov. 14, 2018.

(51) Int. Cl.
  H04N 19/20 (2014.01)
  H04N 7/15 (2006.01)
  G06T 7/73 (2017.01)
  G06V 40/16 (2022.01)
  G06T 5/00 (2006.01)

(52) U.S. Cl.
  CPC ........... *G06V 40/168* (2022.01); *H04N 7/157* (2013.01); *H04N 19/20* (2014.11); *G06T 2207/20081* (2013.01); *G06T 2207/20084* (2013.01); *G06T 2207/30201* (2013.01)

(58) Field of Classification Search
  CPC . G06T 2207/30201; G06T 5/003; G06T 7/73; G06T 9/00; G06T 9/002; H04N 19/20; H04N 7/15; H04N 7/157
  See application file for complete search history.

(56) References Cited

U.S. PATENT DOCUMENTS

2019/0156248 A1* 5/2019 Togashi ............... G06K 9/6255
2020/0067818 A1 2/2020 Jeuk et al.

OTHER PUBLICATIONS

Bau, D., et al., "Visualizing and understanding generative adversarial networks," Submitted to the ICLR 2019, https://openreview.net/forurm?id=Hyg_x2C5FX, 2018.
Ben-Yosef, M., et al., "Gaussian mixture generative adversarial networks for diverse datasets, and the unsupervised clustering of images," CoRR, abs/1808.10356 (2018).
Brock, A., et al., "Large scale GAN training for high fidelity natural image synthesis," CoRR, abs/1809.11096 (2018).
Chen, T., On self modulation for generative adversarial networks, CoRR, abs/1810.01365 (2018).
Chen, T.Q., et al., "Isolating sources of disentanglement in variational autoencoders," CoRR, abs/1802.04942 (2018).
Chen, X., et al., "InfoGAN: interpretable representation learning by information maximizing generative adversarial nets," CoRR, abs/1606.03657 (2016).
Denton, E.L., et al., "Deep generative image models using a Laplacian pyramic of adversarial networks," CoRR, abs/1506.05751 (2015).
Desjardins, G., et al., Disentangling factors of variation via generative entangling, CoRR, abs/1210.5474 (2012).
Donahue, J., et al., "Adversarial feature learning," CoRR, abs/1605.09782 (2016).
Dosovitskiy, J.T., et al., Learning to generate chairs with convolutional neural networks, CoRR, abs/1411.5928 (2014).
Drucker, H., et al., "Improving generalization performance using double backpropagation," IEEE Transactions on Neural Networks, 3(6):991-997 (1992).
Dumoulin, V., et al., "Adversarially learned inference," in Proc. ICLR (2017).
Durugkar, I.P., et al., "Generative multi-adversarial networks," CoRR, abs/1611.01673 (2016).
Eastwood, C., et al., "A framework for the quantitative evaluation of disentangled representations," in Proc. ICLR (2018).
Gatys, L.A., et al., "Image style transfer using convolutional neural networks," in Proc. CVPR (2016).
Goodfellow, I., et al., "Generative Adversarial Networks," in NIPS (2014).
Guan-Yuan Ho, W.S., et al., "MIXGAN: learning concepts from different domains for mixture generation," CoRR, abs/1807.01659 (2018).
Gulrajani, I., et al., "Improved training of Wasserstein GANs," CoRR, abs/1704.00028 (2017).
Heusel, M., et al., "GANs trained by a two time-scale update rule converge to a local Nash equilibrium," in NIPS, pp. 6626-6637 (2017).
Higgins, I., et al., "beta-vae: Learning basic visual concepts with a constrained variational framework," in Proc. ICLR (2017).
Huang, X., et al., "Arbitrary style transfer in real-time with adaptive instance normalization," CoRR, abs/1703.06868 (2017).
Huang, X., et al., "Multimodal unsupervised image-to-image translation," CoRR, abs/1804.04732 (2018).
Karras, T., et al., "Progressive growing of GANs for improved quality, stability and variation," CoRR, abs/1710.10196 (2017).
Kim, H., et al., "Disentangling by factorising," In Proc. ICML (2018).
Kingma, D.P., et al., "Glow: Generative flow with invertible 1×1 convolutions," CoRR, abs/1807.03039 (2018).
Kingma, D.P., et al., "Auto-encoding variational bayes," In ICLR (2014).
Kurach, K., et al., "The gan landscape: Losses, architectures, regularization, and normalization," CoRR, abs/1807.04720 (2018).
Laine, S., et al., "Feature-based metrics for exploring the latent space of generative models," Technical report (2018).
Li, Y., et al., "Demystifying neural style transfer," CoRR, abs/1701.01036 (2017).
Lucic, M., et al., "Are GANs created equal? A large-scale study," CoRR, abs/1711.10337 (2017).
Matthey, L., et al., "Disentanglement testing sprites dataset," found at: https://github.com/deepmind/dsprites-dataset/ (2017).
Mescheder, L., et al., "Which training methods for GANs do actually converge?" CoRR, abs/1801.04406 (2018).
Miyato, T., et al., "Spectral normalization for generative adversarial networks," CoRR, abs/1802.05957 (2018).
Miyato, T., et al., "CGANs with projection discriminator," CoRR, abs/1802.05637 (2018).
Mordido, G., et al., "Dropout-gan: Learning from a dynamic ensemble of discriminators," CoRR, abs/1807.11346 (2018).
Mukherfee, S., et al., Cluster-GAN: Latent space clustering in generative adversarial networks, CoRR, abs/1809.03627 (2018).
Rezende, D.J., et al., "Stochastic backpropagation and approximate inference in deep generative models," in Proc. ICML (2014).
Ridgeway, K., "A survey of inductive biases for factorial representation-learning," CoRR, abs/1612.05299 (2016).
Ross, A.S., et al., "Improving the adversarial robustness and interpretability of deep neural networks by regularizing their input gradients," CoRR, abs/1711.09404 (2017).
Sainburg, T., et al., "Generative adversarial interpolative autoencoding: adversarial training on latent space interpolations encourage convex latest distributions," CoRR abs/1807.06650 (2018).
Salimans, T., et al., "Improved techniques fortraining GANs," in NIPS, (2016).
Schmidhuber, J., "Learning factorial codes by predictability minimization," Neural Computation, 4(6):863-879 (1992).
Sharma, R., et al., "Improved training with curriculum gans," CoRR, abs/1807.09295 (2018).
Shoemake, K., "Animating rotation with quaternion curves," in Proc. SIGGRAPH'85 (1985).
Simonyan, K., et al., "Very deep convolutional networks for large-scale image recognition," CoRR, abs/1409.1556 (2014).
Wang, T., et al., "High-resolution image synthesis and semantic manipulation with conditional GANs," CoRR, abs/1711.11585 (2017).

(56) References Cited

OTHER PUBLICATIONS

White, T., "Sampling generative networks: Notes on a few effective techniques," CoRR abs/1609.04468 (2016).
Zhang, H., et al., "Self-attention generative adversarial networks," CoRR, abs/1805.08318 (2018).
Zhang, R., et al., "The unreasonable effectiveness of deep features as a perceptual metric," in Proc. CVPR (2018).
Abadi, M., et al., "TensorFlow: a system for large-scale machine learning," in Proc. $12^{th}$ USENIX Conference on Operating Systems Designs and Implementation, OSDI'16, pp. 265-283 (2016).
Kingma, D.P., et al., "A method for stochastic optimization," in ICLR (2015).
U.S. Appl. No. 17/069,478, filed Oct. 13, 2020.
U.S. Appl. No. 17/069,449, filed Oct. 13, 2020.
U.S. Appl. No. 16/418,317, filed May 21, 2019.
U.S. Appl. No. 17/143,516, filed Jan. 7, 2021.
U.S. Appl. No. 18/079,772, filed Dec. 12, 2022.

* cited by examiner

GENERATIVE ADVERSARIAL NEURAL NETWORK ASSISTED RECONSTRUCTION

CLAIM OF PRIORITY

This application is a continuation of U.S. patent application Ser. No. 17/069,449 titled "Generative Adversarial Neural Network Assisted Video Reconstruction," filed Oct. 13, 2020 and Ser. No. 17/069,478 titled "Generative Adversarial Neural Network Assisted Video Compression and Broadcast," filed Oct. 13, 2020 which each claim the benefit of U.S. Provisional Application No. 63/010,511 titled "Generative Neural Network Assisted Video Compression and Decompression," filed Apr. 15, 2020, the entire contents of which is incorporated herein by reference. U.S. patent application Ser. Nos. 17/069,449 and 17/069,478 are each a continuation-in-part of U.S. patent application Ser. No. 16/418,317 titled "A Style-Based Architecture For Generative Neural Networks," filed May 21, 2019 which claims the benefit of U.S. Provisional Application No. 62/767,417 titled "A Style-Based Architecture For Generative Neural Networks," filed Nov. 14, 2018 and U.S. Provisional Application No. 62/767,985 titled "A Style-Based Architecture For Generative Neural Networks," filed Nov. 15, 2018, the entire contents of these applications is incorporated herein by reference.

This application is a continuation-in-part of U.S. patent application Ser. No. 16/418,317 titled "A Style-Based Architecture For Generative Neural Networks," filed May 21, 2019 which claims the benefit of U.S. Provisional Application No. 62/767,417 titled "A Style-Based Architecture For Generative Neural Networks," filed Nov. 14, 2018 and U.S. Provisional Application No. 62/767,985 titled "A Style-Based Architecture For Generative Neural Networks," filed Nov. 15, 2018, the entire contents of these applications is incorporated herein by reference. This application also claims the benefit of U.S. Provisional Application No. 63/010,511 titled "Generative Neural Network Assisted Video Compression and Decompression," filed Apr. 14, 2020, the entire contents of which is incorporated herein by reference.

TECHNICAL FIELD

The present invention relates to neural networks, and in particular, to a generator architecture for synthesizing data using scale-specific controls.

BACKGROUND

The resolution and quality of images produced by generative adversarial networks (GAN) has improved recently. Yet GANs continue to operate as black boxes, and despite recent efforts, the understanding of various aspects of the image synthesis process, e.g., the origin of stochastic features, is still lacking. The properties of the latent space are also poorly understood, and the commonly demonstrated latent space interpolations provide no quantitative way to compare different GANs against each other. There is a need for addressing these issues and/or other issues associated with the prior art.

SUMMARY

A style-based generative network architecture enables scale-specific control of synthesized output data, such as images. During training, the style-based generative neural network (generator neural network) includes a mapping network and a synthesis network. During prediction, the mapping network may be omitted, replicated, or evaluated several times. The synthesis network may be used to generate highly varied, high-quality output data with a wide variety of attributes. For example, when used to generate images of people's faces, the attributes that may vary are age, ethnicity, camera viewpoint, pose, face shape, eyeglasses, colors (eyes, hair, etc.), hair style, lighting, background, etc. Depending on the task, generated output data may include images, audio, video, three-dimensional (3D) objects, text, etc.

A latent code defined in an input space is processed by the mapping neural network to produce an intermediate latent code defined in an intermediate latent space. The intermediate latent code may be used as appearance vector that is processed by the synthesis neural network to generate an image. The appearance vector is a compressed encoding of data, such as video frames including a person's face, audio, and other data. Captured images may be converted into appearance vectors at a local device and transmitted to a remote device using much less bandwidth compared with transmitting the captured images. A synthesis neural network at the remote device reconstructs the images for display.

A method, computer readable medium, and system are disclosed for generative adversarial neural network assisted video reconstruction. Replication data specific to a real or synthetic subject is obtained for configuring a synthesis neural network. An appearance vector is received that encodes attributes of a human face captured in a frame of video. The synthesis neural network processes the appearance vector to reconstruct an image of the human face including characteristics defined by the replication data.

DETAILED DESCRIPTION

A style-based generative network architecture enables scale-specific control of the synthesized output. A style-based generator system includes a mapping network and a synthesis network. Conceptually, in an embodiment, feature maps (containing spatially varying information representing content of the output data, where each feature map is one channel of intermediate activations) generated by different layers of the synthesis network are modified based on style control signals provided by the mapping network. The style control signals for different layers of the synthesis network may be generated from the same or different latent codes. As used herein, the term style control signals control attributes of synthesized images of a subject such as pose, general hair style, face shape, eyeglasses, colors (eyes, hair, lighting), and microstructure. A latent code may be a random N-dimensional vector drawn from, e.g., a Gaussian distribution. The style control signals for different layers of the synthesis network may be generated from the same or different mapping networks. Additionally, spatial noise may be injected into each layer of the synthesis network.

Figure 1A:
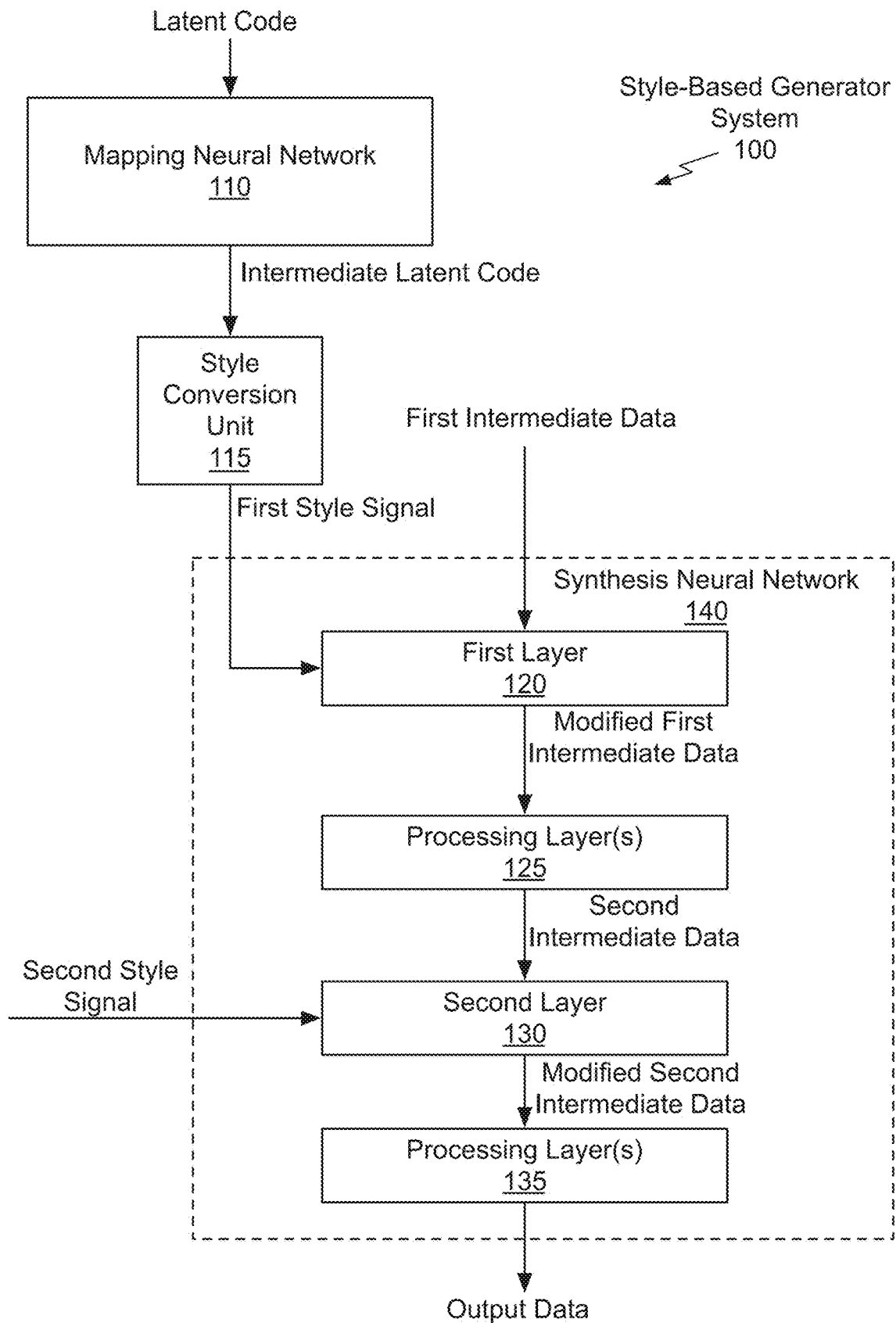
FIG. 1A illustrates a block diagram of a style-based generator system, in accordance with an embodiment.

FIG. 1A illustrates a block diagram of a style-based generator system 100, in accordance with an embodiment. The style-based generator system 100 includes a mapping neural network 110, a style conversion unit 115, and a synthesis neural network 140. After the synthesis neural network 140 is trained, the synthesis neural network 140 may be deployed without the mapping neural network 110 when the intermediate latent code(s) and/or the style signals produced by the style conversion unit 115 are pre-computed. In an embodiment, additional style conversion units 115 may be included to convert the intermediate latent code generated by the mapping neural network 110 into a second style signal or to convert a different intermediate latent code into the second style signal. One or more additional mapping neural networks 110 may be included in the style-based generator system 100 to generate additional intermediate latent codes from the latent code or additional latent codes.

The style-based generator system 100 may be implemented by a program, custom circuitry, or by a combination of custom circuitry and a program. For example, the style-based generator system 100 may be implemented using a GPU (graphics processing unit), CPU (central processing unit), or any processor capable of performing the operations described herein. Furthermore, persons of ordinary skill in the art will understand that any system that performs the operations of the style-based generator system 100 is within the scope and spirit of embodiments of the present invention.

Conventionally, a latent code is provided to a generator through an input layer, such as the first layer of a feedforward neural network. In contrast, in an embodiment, instead of receiving the latent code, the synthesis neural network 140 starts from a learned constant and the latent code is input to the mapping neural network 110. In an embodiment, the first intermediate data is the learned constant. Given a latent code z in the input latent space $\mathcal{Z}$, a non-linear mapping network $f: \mathcal{Z} \rightarrow \mathcal{W}$ first produces intermediate latent code $w \in \mathcal{W}$. The mapping neural network 110 may be configured to implement the non-linear mapping network. In an embodiment, the dimensions of input and output activations in the input latent space $\mathcal{Z}$ and the intermediate latent space $\mathcal{W}$ are equal (e.g., 512). In an embodiment, the mapping function $f$ is implemented using an 8-layer MLP (multilayer perceptron, i.e., a neural network consisting of only fully-connected layers).

While the conventional generator only feeds the latent code though the input layer of the generator, the mapping neural network 110 instead maps the input latent code z to the intermediate latent space $\mathcal{W}$ to produce the intermediate latent code w. The style conversion unit 115 converts the intermediate latent code w into a first style signal. One or more intermediate latent codes w are converted into spatially invariant styles including the first style signal and a second style signal. In contrast with conventional style transfer techniques, the spatially invariant styles are computed from a vector, namely the intermediate latent code w, instead of from an example image. The one or more intermediate latent codes w may be generated by one or more mapping neural networks 110 for one or more respective latent codes z. The synthesis neural network 140 processes the first intermediate data (e.g., a learned constant encoded as a feature map) according to the style signals, for example, increasing density of the first intermediate data from 4×4 to 8×8 and continuing until the output data density is reached.

In an embodiment, the style conversion unit 115 performs an affine transformation. The style conversion unit 115 may be trained to learn the affine transformation during training of the synthesis neural network 140. The first style signal controls operations at a first layer 120 of the synthesis neural network 140 to produce modified first intermediate data. In an embodiment, the first style signal controls an adaptive instance normalization (AdaIN) operation within the first layer 120 of the synthesis network 140. In an embodiment, the AdaIN operation receives a set of content feature maps and a style signal and modifies the first-order statistics (i.e., the "style") of the content feature maps to match first-order statistics defined by the style signal. The modified first intermediate data output by the first layer 120 is processed by processing layer(s) 125 to generate second intermediate data. In an embodiment, the processing layer(s) 125 include a 3×3 convolution layer. In an embodiment, the processing layer(s) 125 include a 3×3 convolution layer followed by an AdaIN operation that receives an additional style signal, not explicitly shown in FIG. 1A.

The second intermediate data is input to a second layer 130 of the synthesis neural network 140. The second style signal controls operations at the second layer 130 to produce modified second intermediate data. In an embodiment, the first style signal modifies a first attribute encoded in the first intermediate data and the second style signal modifies a second attribute encoded in the first intermediate data and the second intermediate data. For example, the first intermediate data is coarse data compared with the second intermediate data and the first style is transferred to coarse feature maps at the first layer 120 while the second style is transferred to higher density feature maps at the second layer 130.

In an embodiment, the second layer 130 up-samples the second intermediate data and includes a 3×3 convolution layer followed by an AdaIN operation. In an embodiment, the second style signal controls an AdaIN operation within the second layer 130 of the synthesis network 140. The modified second intermediate data output by the second layer 130 is processed by processing layer(s) 135 to generate output data including content corresponding to the second intermediate data. In an embodiment, multiple (e.g., 32, 48, 64, 96, etc.) channels of features in the modified second intermediate data are converted into the output data that is encoded as color channels (e.g., red, green, blue).

In an embodiment, the processing layer(s) 135 includes a 3×3 convolution layer. In an embodiment, the output data is an image including first attributes corresponding to a first scale and second attributes corresponding to a second scale, where the first scale is coarser compared with the second scale. The first scale may correspond to a scale of the feature maps processed by the first layer 120 and the second scale may correspond to a scale of the feature maps processed by the second layer 130. Accordingly, the first style signal modifies the first attributes at the first scale and the second style signal modifies the second attributes at the second scale.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
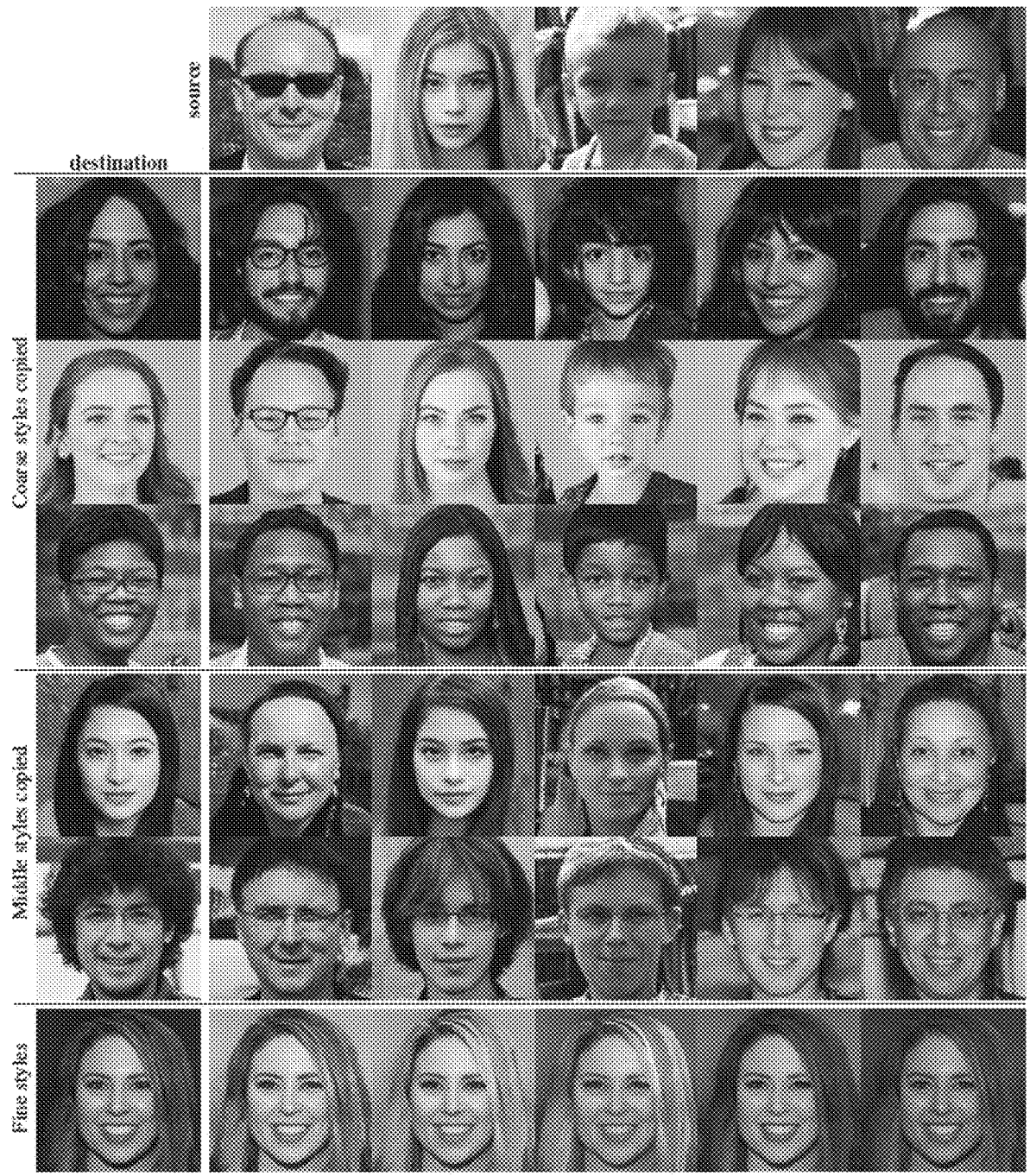
FIG. 1B illustrates images generated by the style-based generator system, in accordance with an embodiment.

FIG. 1B illustrates images generated by the style-based generator system 100, in accordance with an embodiment. The images are generated in $1024^2$ resolution. In other embodiments, the images can be generated at a different resolution. Two different latent codes are used to control the styles of images generated by the style-based generator system 100. Specifically, a first portion of the styles are produced by the mapping neural network 110 and a style conversion unit 115 from the "source" latent codes in the top row. A second portion of the styles are produced by the same or an additional mapping neural network 110 and a corresponding style conversion unit 115 from the "destination" latent codes in the leftmost column. The style-based generator system 100 starts from a learned constant input at the synthesis neural network 140 and adjusts the "style" of the image at each convolution layer based on the latent code, therefore directly controlling the strength of image attributes, encoded in feature maps, at different scales. In other words, a given set of styles from "source" data is copied to "destination" data. Thus, the copied styles (coarse, middle, or fine) are taken from the "source" data while all the other styles are kept the same as in the "destination" data.

The first portion of styles (destination) are applied by the synthesis neural network 140 to process the learned constant with a first subset of the first portion of styles replaced with a corresponding second subset of the second portion of the styles (source). In an embodiment, the learned constant is a 4×4×512 constant tensor. In the second, third, and fourth rows of images in FIG. 1B, the second portion of the styles (source) replaces the first portion of the styles (destination) at coarse layers of the synthesis neural network 140. In an embodiment, the coarse layers correspond to coarse spatial densities $4^2$-$8^2$. In an embodiment, high-level attributes such as pose, general hair style, face shape, and eyeglasses are copied from the source, while other attributes, such as all colors (eyes, hair, lighting) and finer facial features of the destination are retained.

In the fifth and sixth rows of images in FIG. 1B, second portion of the styles (source) replaces the first portion of the styles (destination) at middle layers of the synthesis neural network 140. In an embodiment, the middle layers correspond to spatial densities of $16^2$-$32^2$. Smaller scale facial features, hair style, eyes open/closed are inherited from the source, while the pose, general face shape, and eyeglasses from the destination are preserved. Finally, in the last row of images in FIG. 1B, the second portion of the styles (source) replaces the first portion of the styles (destination) at high density (fine) layers of the synthesis neural network 140. In an embodiment, the fine layers correspond to spatial densities of $64^2$-$1024^2$. Using the styles from the second portion of the styles (source) for the fine layers inherits the color scheme and microstructure from the source while preserving the pose and general face shape from the destination.

The architecture of the style-based generator system 100 enables control of the image synthesis via scale-specific modifications to the styles. The mapping network 110 and affine transformations performed by the style conversion unit 115 can be viewed as a way to draw samples for each style from a learned distribution, and the synthesis network 140 provides a mechanism to generate a novel image based on a collection of styles. The effects of each style are localized in the synthesis network 140, i.e., modifying a specific subset of the styles can be expected to affect only certain attributes of the image.

Using style signals from at least two different latent codes, as shown in FIG. 1B, is referred to as style mixing or mixing regularization. Style mixing during training decorrelates neighboring styles and enables more fine-grained control over the generated imagery. In an embodiment, during training a given percentage of images are generated using two random latent codes instead of one. When generating such an image, a random location (e.g., crossover point) in the synthesis neural network 140 may be selected where processing switches from using style signals generated using a first latent code to style signals generated using a second latent code. In an embodiment, two latent codes $z_1$, $z_2$ are processed by the mapping neural network 110, and the corresponding intermediate latent codes $w_1$, $w_2$ control the styles so that $w_1$ applies before the crossover point and $w_2$ after the crossover point. The mixing regularization technique prevents the synthesis neural network 140 from assuming that adjacent styles are correlated.

TABLE 1 shows how enabling mixing regularization during training may improve localization of the styles considerably, indicated by improved (lower is better) Fréchet inception distances (FIDs) in scenarios where multiple latent codes are mixed at test time. The images shown in FIG. 1B are examples of images synthesized by mixing two latent codes at various scales. Each subset of styles controls meaningful high-level attributes of the image.

TABLE 1

FIDs for different mixing regularization ratios

| Mixing ratio | Number of latent codes (test time) | | | |
|---|---|---|---|---|
| (training time) | 1 | 2 | 3 | 4 |
| 0% | 4.42 | 8.22 | 12.88 | 17.41 |
| 50% | 4.41 | 6.10 | 8.71 | 11.61 |
| 90% | 4.40 | 5.11 | 6.88 | 9.03 |
| 100% | 4.83 | 5.17 | 6.63 | 8.40 |

The mixing ratio indicates that percentage of training examples for which mixing regularization is enabled. A maximum of four different latent codes were randomly selected during test time and the crossover points between the different latent codes were also randomly selected. Mixing regularization improves the tolerance to these adverse operations significantly.

As confirmed by the FIDs, the average quality of the images generated by the style-based generator system 100 is high, and even accessories such as eyeglasses and hats are successfully synthesized. For the images shown in FIG. 1B, sampling from the extreme regions of $\mathcal{W}$ is avoided by using the so-called truncation trick that can be performed in $\mathcal{W}$ instead of $\mathcal{Z}$. Note that the style-based generator system 100 may be implemented to enable application of the truncation selectively to low resolutions only, so that high-resolution details are not affected.

Considering the distribution of training data, areas of low density are poorly represented and thus likely to be difficult for the style-based generator system 100 to learn. Non-uniform distributions of training data present a significant open problem in all generative modeling techniques. However, it is known that drawing latent vectors from a truncated or otherwise shrunk sampling space tends to improve average image quality, although some amount of variation is lost. In an embodiment, to improve training of the style-based generator system 100, a center of mass of $\mathcal{W}$ is computed as $\bar{w} = \mathbb{E}_{z \sim P(z)}[f(z)]$. In the case of one dataset of human faces (e.g., FFHQ, Flickr-Faces-HQ), the point represents a sort of an average face ($\psi=0$). The deviation of a given w is scaled down from the center as $w' = \bar{w} + \psi(w - \bar{w})$, where $\psi < 1$. In conventional generative modeling systems, only a subset of the neural networks are amenable to such truncation, even when orthogonal regularization is used, truncation in $\mathcal{W}$ space seems to work reliably even without changes to the loss function.

Figure 1C:
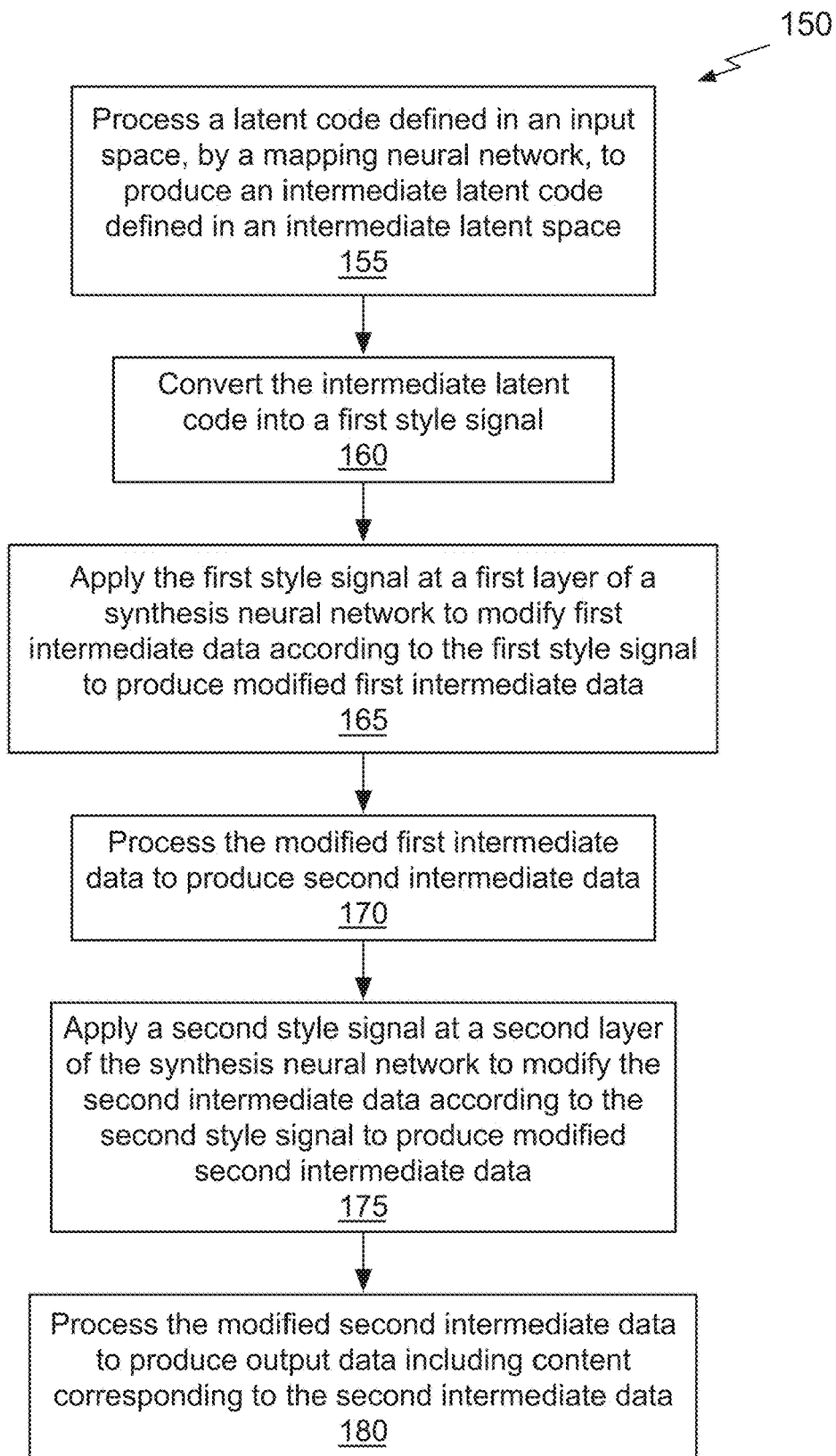
FIG. 1C illustrates a flowchart of a method for style-based generation, in accordance with an embodiment.

FIG. 1C illustrates a flowchart of a method 150 for style-based generation, in accordance with an embodiment. The method 150 may be performed by a program, custom circuitry, or by a combination of custom circuitry and a program. For example, the method 150 may be executed by a GPU (graphics processing unit), CPU (central processing unit), or any processor capable of performing the operations of the style-based generator system 100. Furthermore, persons of ordinary skill in the art will understand that any system that performs method 150 is within the scope and spirit of embodiments of the present invention.

At step 155, the mapping neural network 110 processes a latent code defined in an input space, to produce an intermediate latent code defined in an intermediate latent space. At step 160, the intermediate latent code is converted into a first style signal by the style conversion unit 115. At step 165, the first style signal is applied at a first layer 120 of the synthesis neural network 140 to modify the first intermediate data according to the first style signal to produce modified first intermediate data. At step 170, the modified first intermediate data is processed by the processing layer(s) 125 to produce the second intermediate data. At step 175, a second style signal is applied at the second layer 130 of the synthesis neural network 140 to modify the second intermediate data according to the second style signal to produce modified second intermediate data. At step 180, the modified second intermediate data is processed by the processing layer(s) 135 to produce output data including content corresponding to the second intermediate data.

There are various definitions for disentanglement, but a common goal is a latent space that consists of linear subspaces, each of which controls one factor of variation. However, the sampling probability of each combination of factors in the latent space $\mathcal{Z}$ needs to match the corresponding density in the training data.

A major benefit of the style-based generator system 100 is that the intermediate latent space $\mathcal{W}$ does not have to support sampling according to any fixed distribution; the sampling density for the style-based generator system 100 is induced by the learned piecewise continuous mapping $f(z)$. The mapping can be adapted to "unwarp" $\mathcal{W}$ so that the factors of variation become more linear. The style-based generator system 100 may naturally tend to unwarp $\mathcal{W}$, as it should be easier to generate realistic images based on a disentangled representation than based on an entangled representation. As such, the training may yield a less entangled $\mathcal{W}$ in an unsupervised setting, i.e., when the factors of variation are not known in advance.

Figure 2A:
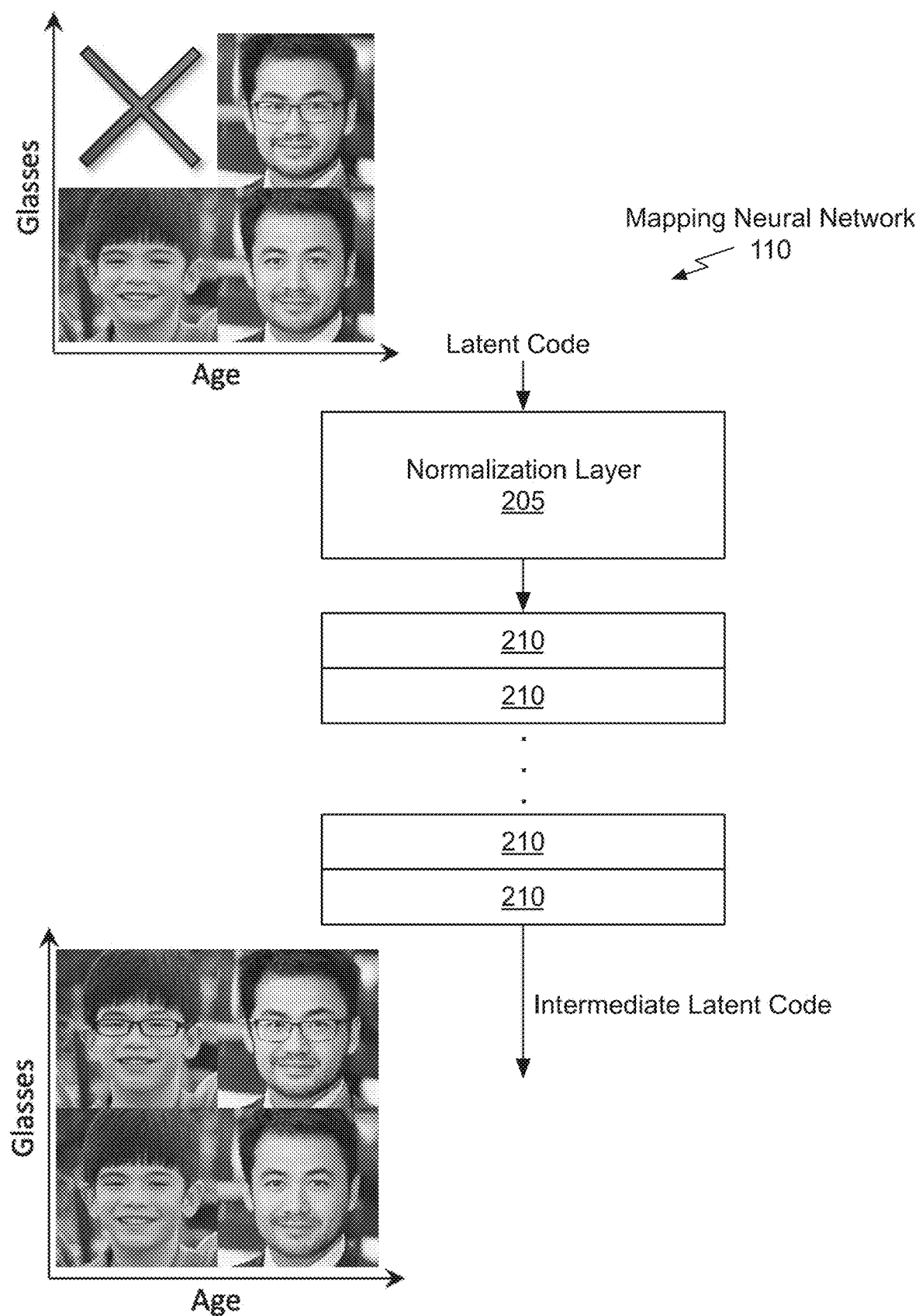
FIG. 2A illustrates a block diagram of the mapping neural network shown in FIG. 1A, in accordance with an embodiment.

FIG. 2A illustrates a block diagram of the mapping neural network 110 shown in FIG. 1A, in accordance with an embodiment. A distribution of the training data may be missing a combination of attributes, such as, children wearing glasses. A distribution of the factors of variation in the combination of glasses and age becomes more linear in the intermediate latent space $\mathcal{W}$ compared with the latent space $\mathcal{Z}$.

In an embodiment, the mapping neural network 110 includes a normalization layer 205 and multiple fully-connected layers 210. In an embodiment, eight fully-connected layers 210 are coupled in sequence to produce the intermediate latent code. Parameters (e.g., weights) of the mapping neural network 110 are learned during training and the parameters are used to process the input latent codes when the style-based generator system 100 is deployed to generate the output data. In an embodiment, the mapping neural network 110 generates one or more intermediate latent codes that are used by the synthesis neural network 140 at a later time to generate the output data.

There are many attributes in human portraits that can be regarded as stochastic, such as the exact placement of hairs, stubble, freckles, or skin pores. Any of these can be randomized without affecting a perception of the image as long as the randomizations follow the correct distribution. The artificial omission of noise when generating images leads to images with a featureless "painterly" look. In particular, when generating human portraits, coarse noise may cause large-scale curling of hair and appearance of larger background features, while the fine noise may bring out the finer curls of hair, finer background detail, and skin pores.

A conventional generator may only generate stochastic variation based on the input to the neural network, as provided through the input layer. During the training, the conventional generator may be forced to learn to generate spatially-varying pseudorandom numbers from earlier activations whenever the pseudorandom numbers are needed. In other words, pseudorandom number generation is not intentionally built into the conventional generator. Instead, the generation of pseudorandom numbers emerges on its own during training in order for the conventional generator to satisfy the training objective. Generating the pseudorandom numbers consumes neural network capacity and hiding the periodicity of generated signal is difficult—and not always successful, as evidenced by commonly seen repetitive patterns in generated images. In contrast, style-based generator system 100 may be configured to avoid these limitations by adding per-pixel noise after each convolution.

In an embodiment, the style-based generator system 100 is configured with a direct means to generate stochastic detail by introducing explicit noise inputs. In an embodiment, the noise inputs are single-channel images consisting of uncorrelated Gaussian noise, and a dedicated noise image is input to one or more layers of the synthesis network 140. The noise image may be broadcast to all feature maps using learned per-feature scaling factors and then added to the output of the corresponding convolution.

Figure 2B:
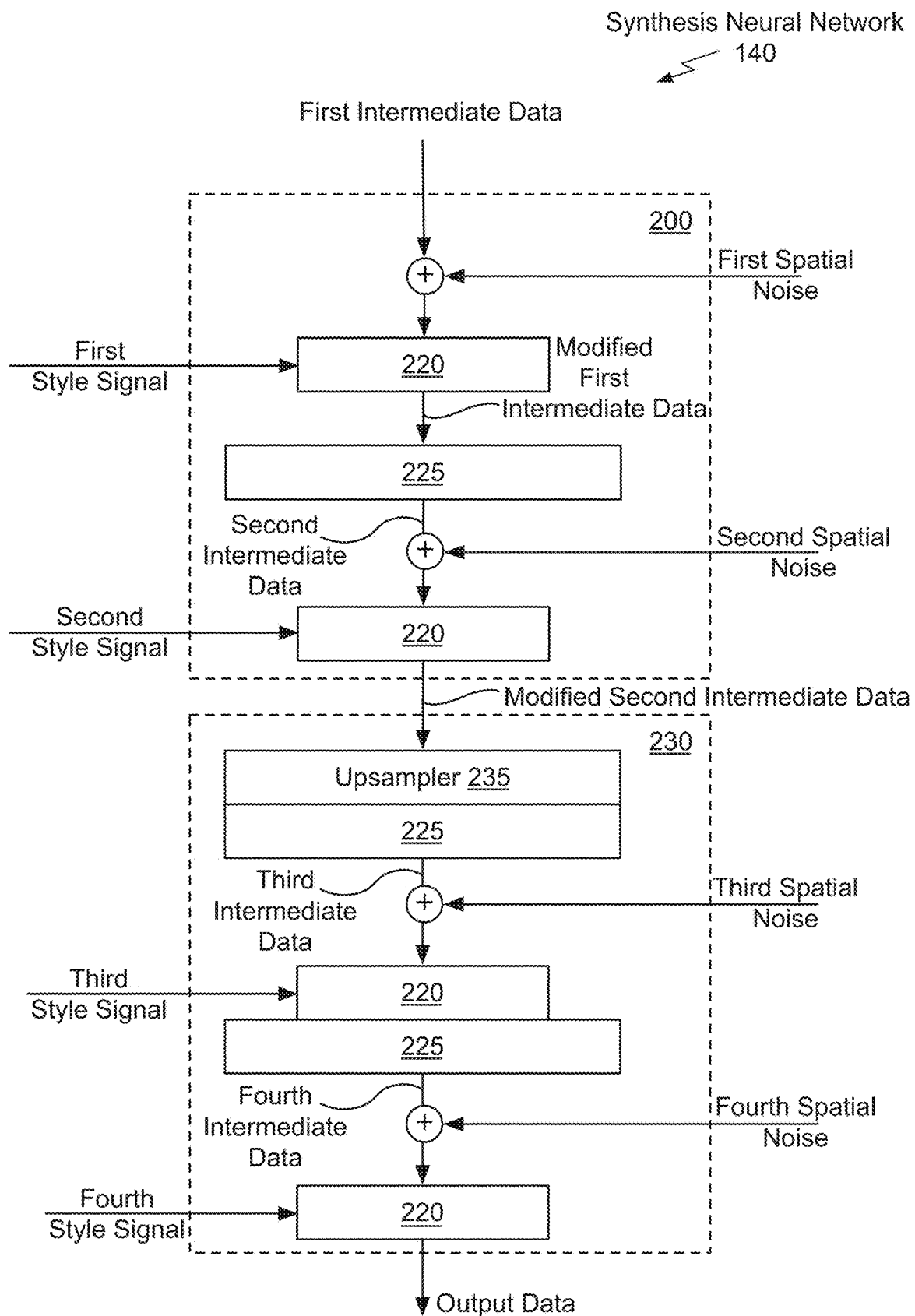
FIG. 2B illustrates a block diagram of the synthesis neural network shown in FIG. 1A, in accordance with an embodiment.

FIG. 2B illustrates a block diagram of the synthesis neural network 140 shown in FIG. 1A, in accordance with an embodiment. The synthesis neural network 140 includes a first processing block 200 and a second processing block 230. In an embodiment, the processing block 200 processes 4×4 resolution feature maps and the processing block 230 processes 8×8 resolution feature maps. One or more additional processing blocks may be included in the synthesis neural network 140 after the processing blocks 200 and 230, before them, and/or between them.

The first processing block 200 receives the first intermediate data, first spatial noise, and second spatial noise. In an embodiment, the first spatial noise is scaled by a learned per-channel scaling factor before being combined with (e.g., added to) the first intermediate data. In an embodiment, the first spatial noise, second spatial noise, third spatial noise, and fourth spatial noise are independent per-pixel Gaussian noise.

The first processing block 200 also receives the first style signal and the second style signal. As previously explained, the style signals may be obtained by processing the intermediate latent code according to a learned affine transform. Learned affine transformations specialize w to styles $y=(y_s, y_b)$ that control adaptive instance normalization (AdaIN) operations implemented by the modules 220 in the synthesis neural network 140. AdaIN is particularly well suited for implementation in the style-based generator system 100 due to its efficiency and compact representation.

The AdaIN operation is defined $$AdaIN(x_i, y) = y_{s,i}\frac{x_i - \mu(x_i)}{\sigma(x_i)} + y_{b,i} \quad (1)$$

where each feature map $x_i$, is normalized separately, and then scaled and biased using the corresponding scalar components from style y. Thus, the dimensionality of y is twice the number of feature maps compared to the input of the layer. In an embodiment, a dimension of the style signal is a multiple of a number of feature maps in the layer at which the style signal is applied. In contrast with conventional style transfer, the spatially invariant style y is computed from vector w instead of an example image.

The effects of each style signal are localized in the synthesis neural network 140, i.e., modifying a specific subset of the style signals can be expected to affect only certain attributes of an image represented by the output data. To see the reason for the localization, consider how the AdaIN operation (Eq. 1) implemented by the module 220 first normalizes each channel to zero mean and unit variance, and only then applies scales and biases based on the style signal. The new per-channel statistics, as dictated by the style, modify the relative importance of features for the subsequent convolution operation, but the new per-channel statistics do not depend on the original statistics because of the normalization. Thus, each style signal controls only a pre-defined number of convolution(s) 225 before being overridden by the next AdaIN operation. In an embodiment, scaled spatial noise is added to the features after each convolution and before processing by another module 225.

Each module 220 may be followed by a convolution layer 225. In an embodiment, the convolution layer 225 applies a 3×3 convolution kernel to the input. Within the processing block 200, second intermediate data output by the convolution layer 225 is combined with the second spatial noise and input to a second module 220 that applies the second style signal to generate an output of the processing block 200. In an embodiment, the second spatial noise is scaled by a learned per-channel scaling factor before being combined with (e.g., added to) the second intermediate data.

The processing block 230 receives feature maps output by the processing block 200 and the feature maps are up-sampled by an up-sampling layer 235. In an embodiment 4×4 feature maps are up-sampled by the up-sampling layer 235 to produce 8×8 feature maps. The up-sampled feature maps are input to another convolution layer 225 to produce third intermediate data. Within the processing block 230, the third intermediate data is combined with the third spatial noise and input to a third module 220 that applies the third style signal via an AdaIN operation. In an embodiment, the third spatial noise is scaled by a learned per-channel scaling factor before being combined with (e.g., added to) the third intermediate data. The output of the third module 220 is processed by another convolution layer 225 to produce fourth intermediate data. The fourth intermediate data is combined with the fourth spatial noise and input to a fourth module 220 that applies the fourth style signal via an AdaIN operation. In an embodiment, the fourth spatial noise is scaled by a learned per-channel scaling factor before being combined with (e.g., added to) the fourth intermediate data.

In an embodiment, a resolution of the output data is $1024^2$ and the synthesis neural network 140 includes 18 layers—two for each power-of-two resolution ($4^2$-$1024^2$). The output of the last layer of the synthesis neural network 140 may be converted to RGB using a separate 1×1 convolution. In an embodiment, the synthesis neural network 140 has a total of 26.2M trainable parameters, compared to 23.1 M in a conventional generator with the same number of layers and feature maps.

Introducing spatial noise affects only the stochastic aspects of the output data, leaving the overall composition and high-level attributes such as identity intact. Separate noise inputs to the synthesis neural network 140 enables the application of stochastic variation to different subsets of layers. Applying a spatial noise input to a particular layer of the synthesis neural network 140 leads to stochastic variation at a scale that matches the scale of the particular layer.

The effect of noise appears tightly localized in the synthesis neural network 140. At any point in the synthesis neural network 140, there is pressure to introduce new content as soon as possible, and the easiest way for the synthesis neural network 140 to create stochastic variation is to rely on the spatial noise inputs. A fresh set of spatial noise is available for each layer in the synthesis neural network 140, and thus there is no incentive to generate the stochastic effects from earlier activations, leading to a localized effect. Therefore, the noise affects only inconsequential stochastic variation (differently combed hair, beard, etc.). In contrast, changes to the style signals have global effects (changing pose, identity, etc.).

In the synthesis neural network 140, when the output data is an image, the style signals affect the entire image because complete feature maps are scaled and biased with the same values. Therefore, global effects such as pose, lighting, or background style can be controlled coherently. Meanwhile, the spatial noise is added independently to each pixel and is thus ideally suited for controlling stochastic variation. If the synthesis neural network 140 tried to control, e.g., pose using the noise, that would lead to spatially inconsistent decisions that would be penalized during training. Thus, the synthesis neural network 140 learns to use the global and local channels appropriately, without explicit guidance.

Figure 2C:
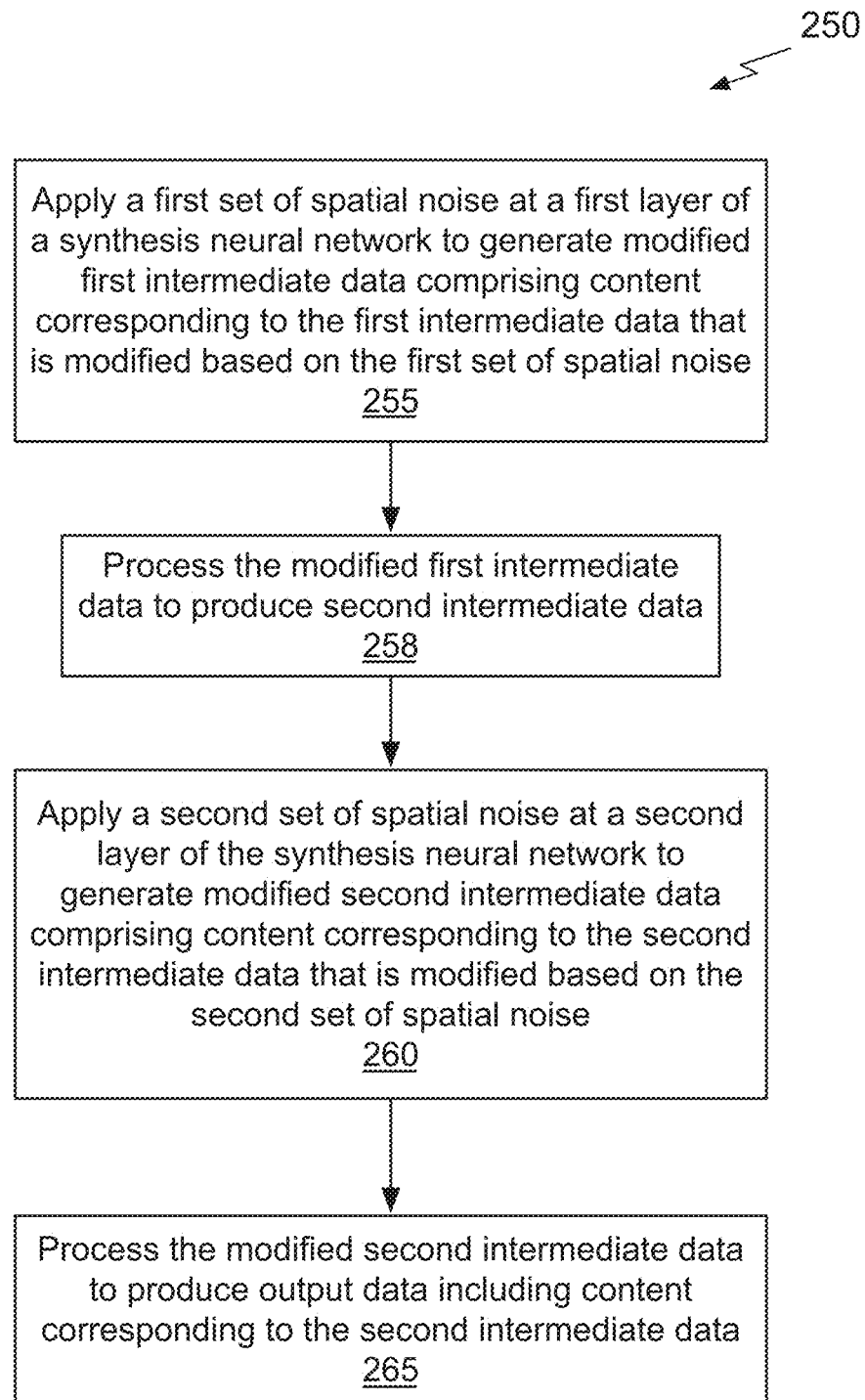
FIG. 2C illustrates a flowchart of a method for applying spatial noise using the style-based generator system, in accordance with an embodiment.

FIG. 2C illustrates a flowchart of a method 250 for applying spatial noise using the style-based generator system 100, in accordance with an embodiment. The method 250 may be performed by a program, custom circuitry, or by a combination of custom circuitry and a program. For example, the method 250 may be executed by a GPU (graphics processing unit), CPU (central processing unit), or any processor capable of performing the operations of the style-based generator system 100. Furthermore, persons of ordinary skill in the art will understand that any system that performs method 250 is within the scope and spirit of embodiments of the present invention.

At step 255, a first set of spatial noise is applied at a first layer of the synthesis neural network 140 to generate the first intermediate data comprising content corresponding to source data that is modified based on the first set of spatial noise. In an embodiment, the source data is the first intermediate data and the first layer is a layer including the module 220 and/or the convolution layer 225. At step 258, the modified first intermediate data is processed by the processing layer(s) 225 to produce the second intermediate data. At step 260, a second set of spatial noise is applied at a second layer of the synthesis neural network 140 to generate second intermediate data comprising content corresponding to the first intermediate data that is modified based on the second set of spatial noise. In an embodiment, the first intermediate data is modified by at least the module 220 to produce the second intermediate data. At step 265, the second intermediate data is processed to produce output data including content corresponding to the second intermediate data. In an embodiment, the second intermediate data is processed by another module 220 and the block 230 to produce the output data.

Noise may be injected into the layers of the synthesis neural network 140 to cause synthesis of stochastic variations at a scale corresponding to the layer. Importantly, the noise should be injected during both training and generation. Additionally, during generation, the strength of the noise may be modified to further control the "look" of the output data. Providing style signals instead of directly inputting the latent code into the synthesis neural network 140 in combination with noise injected directly into the synthesis neural network 140, leads to automatic, unsupervised separation of high-level attributes (e.g., pose, identity) from stochastic variation (e.g., freckles, hair) in the generated images, and enables intuitive scale-specific mixing and interpolation operations.

In particular, the style signals directly adjust the strength of image attributes at different scales in the synthesis neural network 140. During generation, the style signals can be used to modify selected image attributes. Additionally, during training, the mapping neural network 110 may be configured to perform style mixing regularization to improve localization of the styles.

The mapping neural network 110 embeds the input latent code into the intermediate latent space, which has a profound effect on how the factors of variation are represented in the synthesis neural network 140. The input latent space follows the probability density of the training data, and this likely leads to some degree of unavoidable entanglement. The intermediate latent space is free from that restriction and is therefore allowed to be disentangled. Compared to a conventional generator architecture, the style-based generator system 100 admits a more linear, less entangled representation of different factors of variation. In an embodiment, replacing a conventional generator with the style-based generator may not require modifying any other component of the training framework (loss function, discriminator, optimization method, or the like).

Figure 2D:
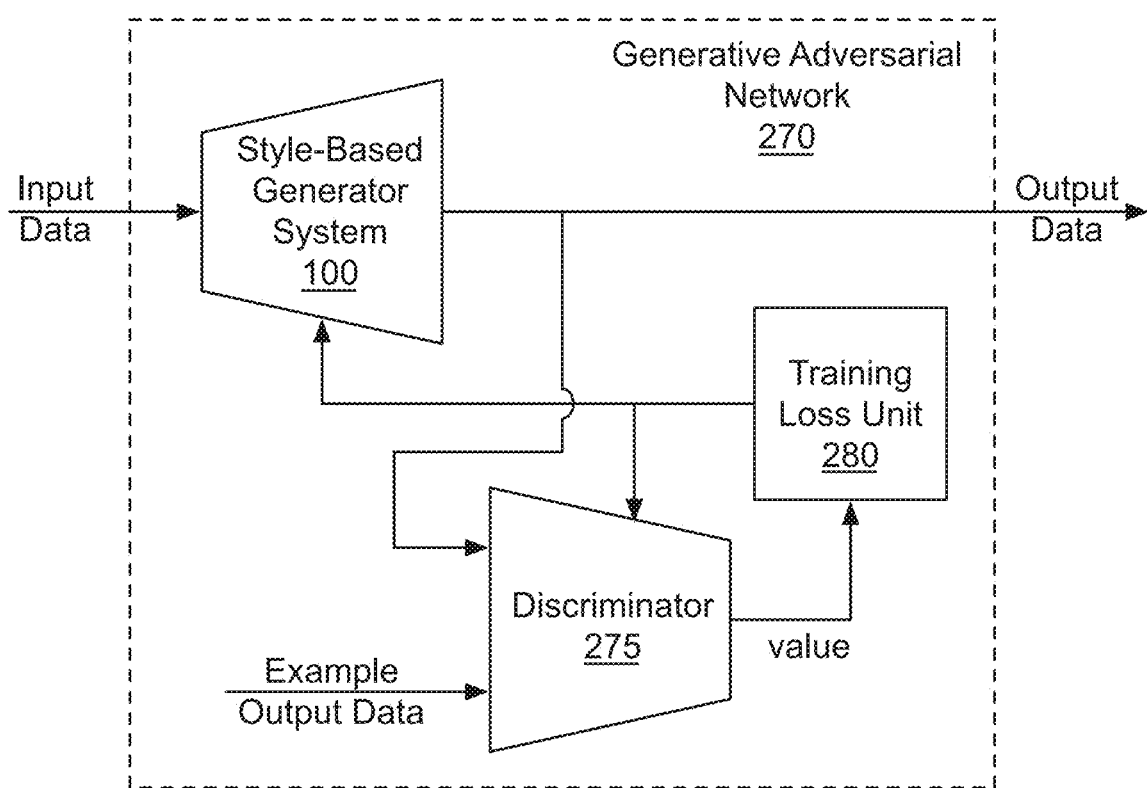
FIG. 2D illustrates a block diagram of a GAN system, in accordance with an embodiment.

The style-based generative neural network 100 may be trained using e.g. the GAN (generative adversarial networks), VAE (variational autoencoder) framework, flow-based framework, or the like. FIG. 2D illustrates a block diagram of the GAN 270 training framework, in accordance with an embodiment. The GAN 270 may be implemented by a program, custom circuitry, or by a combination of custom circuitry and a program. For example, the GAN 270 may be implemented using a GPU, CPU, or any processor capable of performing the operations described herein. Furthermore, persons of ordinary skill in the art will understand that any system that performs the operations of the GAN 270 is within the scope and spirit of embodiments of the present invention.

The GAN 270 includes a generator, such as the style-based generator system 100, a discriminator (neural network) 275, and a training loss unit 280. The topologies of both the generator 110 and discriminator 275 may be modified during training. The GAN 270 may operate in an unsupervised setting or in a conditional setting. The style-based generator system 100 receives input data (e.g., at least one latent code and/or noise inputs) and produces output data. Depending on the task, the output data may be an image, audio, video, or other types of data (e.g., configuration setting). The discriminator 275 is an adaptive loss function that is used during training of the style-based generator system 100. The style-based generator system 100 and discriminator 275 are trained simultaneously using a training dataset that includes example output data that the output data produced by the style-based generator system 100 should be consistent with. The style-based generator system 100 generates output data in response to the input data and the discriminator 275 determines if the output data appears similar to the example output data included in the training data. Based on the determination, parameters of the discriminator 275 and/or the style-based generative neural network 100 are adjusted.

In the unsupervised setting, the discriminator 275 outputs a continuous value indicating how closely the output data matches the example output data. For example, in an embodiment, the discriminator 275 outputs a first training stimulus (e.g., high value) when the output data is determined to match the example output data and a second training stimulus (e.g., low value) when the output data is determined to not match the example output data. The training loss unit 280 adjusts parameters (weights) of the GAN 270 based on the output of the discriminator 275. When the style-based generator system 100 is trained for a specific task, such as generating images of human faces, the discriminator outputs a high value when the output data is an image of a human face. The output data generated by the style-based generator system 100 is not required to be identical to the example output data for the discriminator 275 to determine the output data matches the example output data. In the context of the following description, the discriminator 275 determines that the output data matches the example output data when the output data is perceptually similar to any of the example output data.

In the conditional setting, the input of the style-based generative neural network 100 may include other data, such as an image, a classification label, segmentation contours, and other (additional) types of data (distribution, audio, etc.). The additional data may be specified in addition to the random latent code, or the additional data may replace the random latent code altogether. The training dataset may include input/output data pairs, and the task of the discriminator 275 may be to determine if the output of the style-based generative neural network 100 appears consistent with the input, based on the example input/output pairs that the discriminator 275 has seen in the training data.

In an embodiment, the style-based generative neural network 100 may be trained using a progressive growing technique. In one embodiment, the mapping neural network 110 and/or the synthesis neural network 140 are initially implemented as a generator neural network portion of a GAN and trained using a progressive growing technique, as described in Karras et al., "Progressive Growing of GANs for Improved Quality, Stability, and Variation," Sixth International Conference on Learning Representations (ICLR), (Apr. 30, 2018), which is herein incorporated by reference in its entirety.

Parallel Processing Architecture

Figure 3:
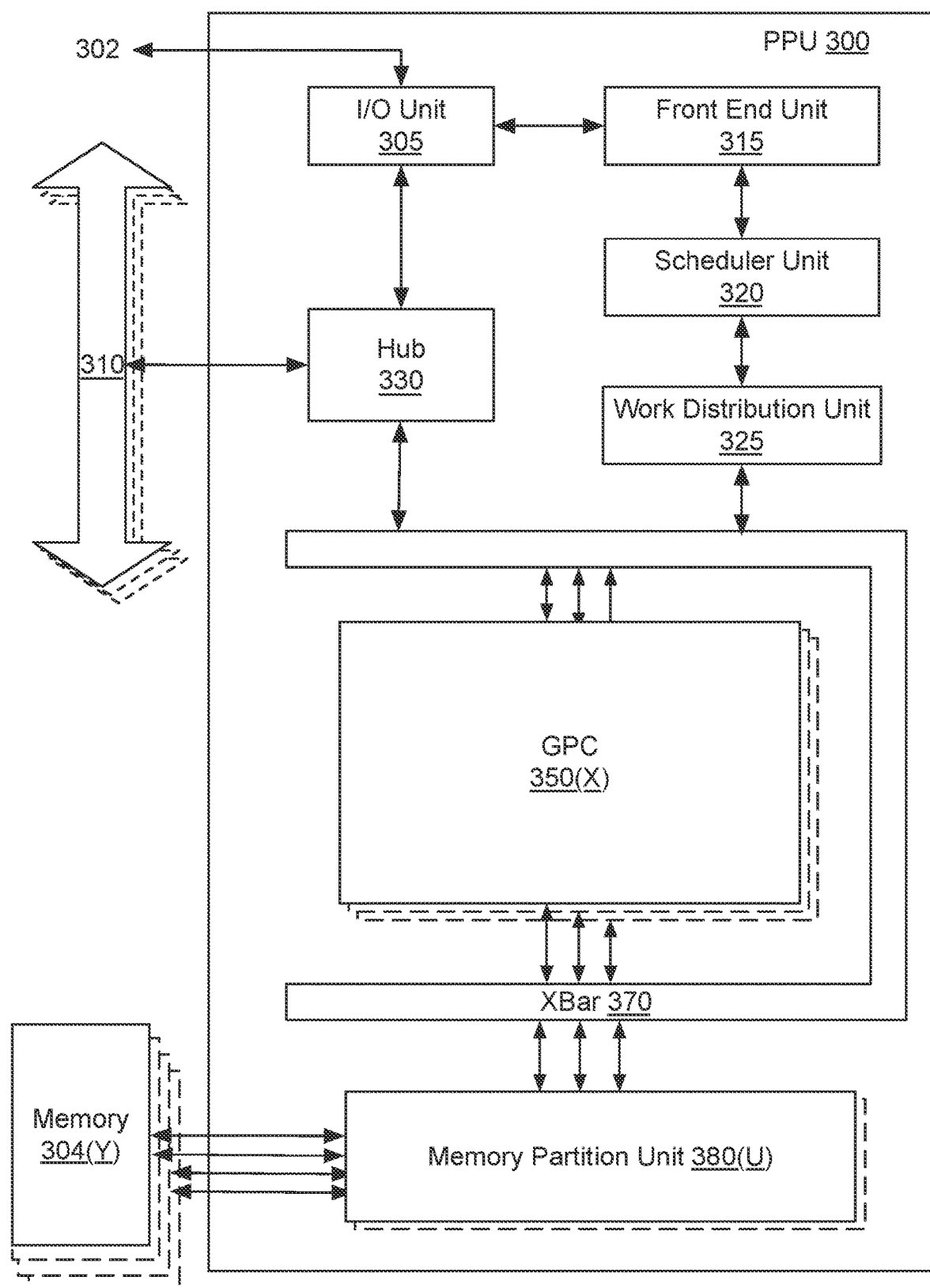
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In another embodiment, the PPU 300 is configured to implement the neural network system 100. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, cloud computing, and machine learning applications. The PPU 300 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
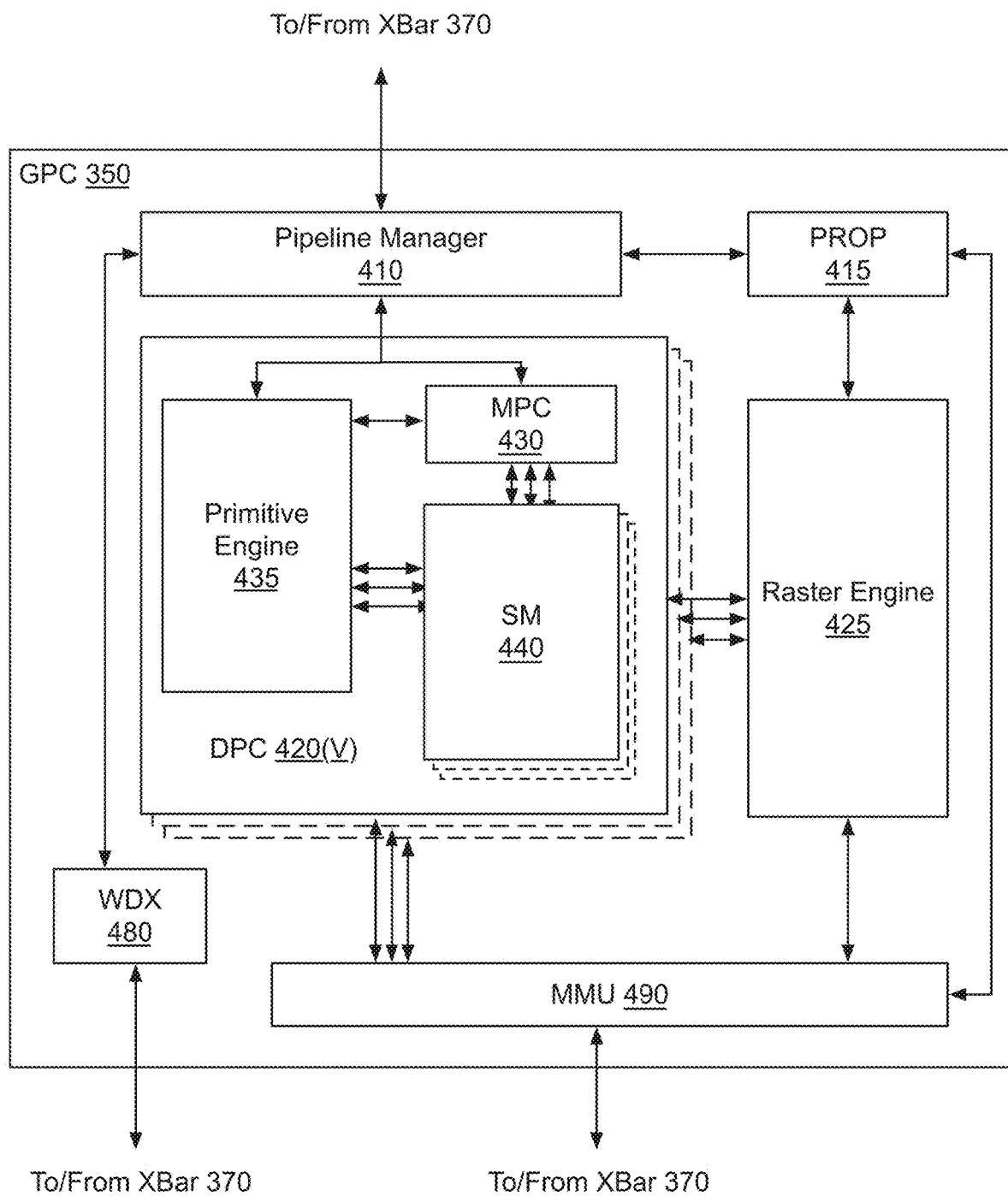
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
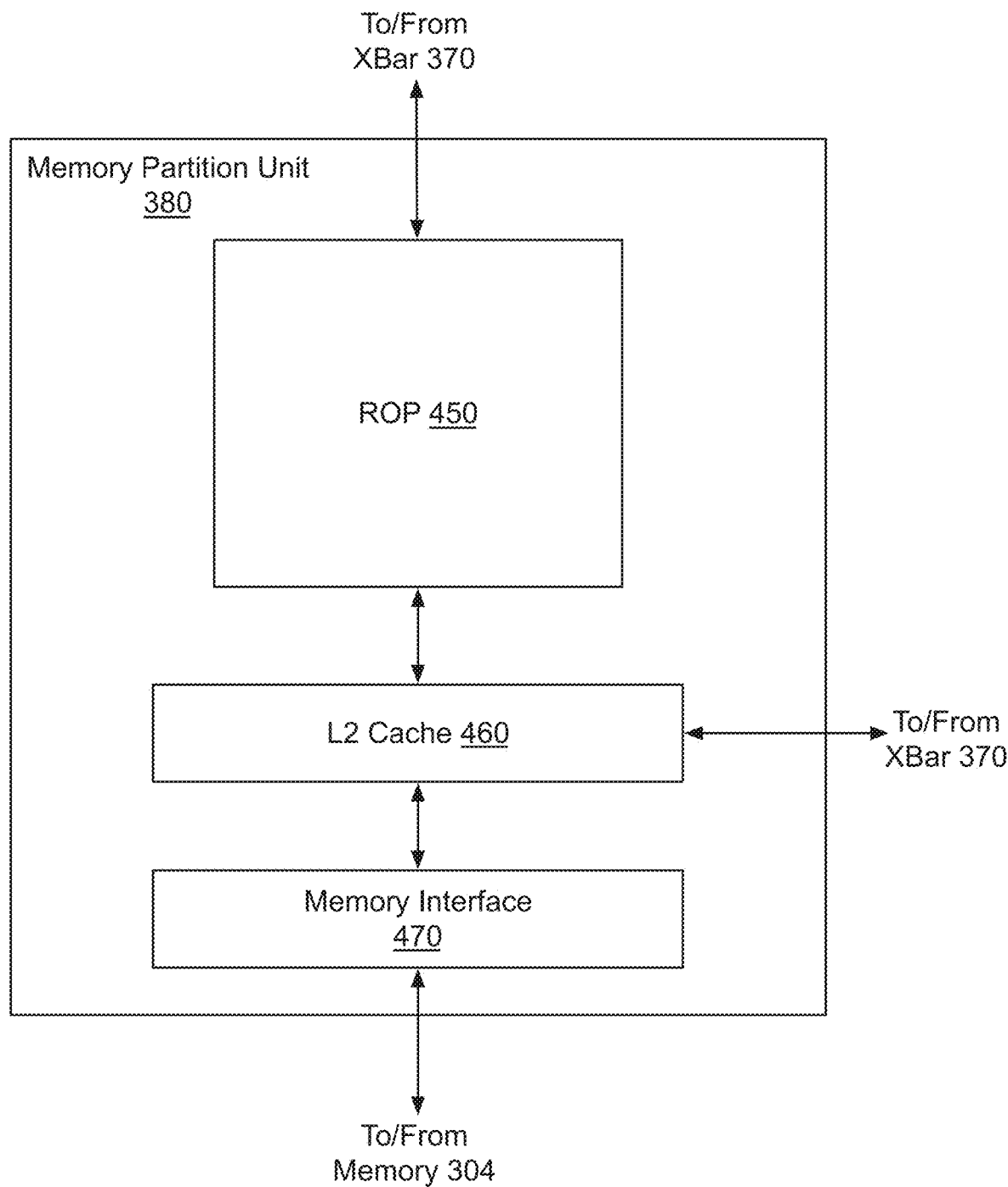
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
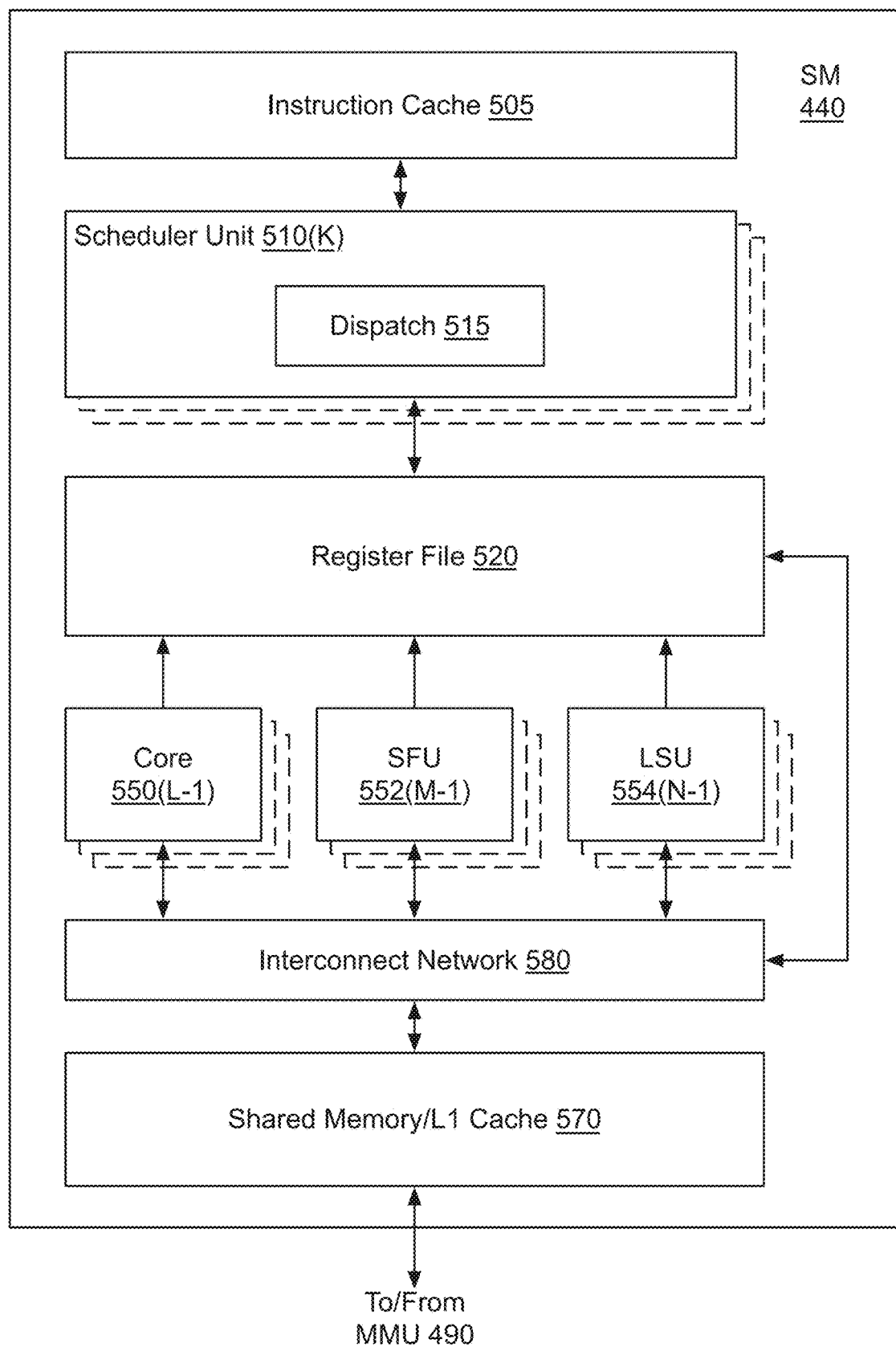
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
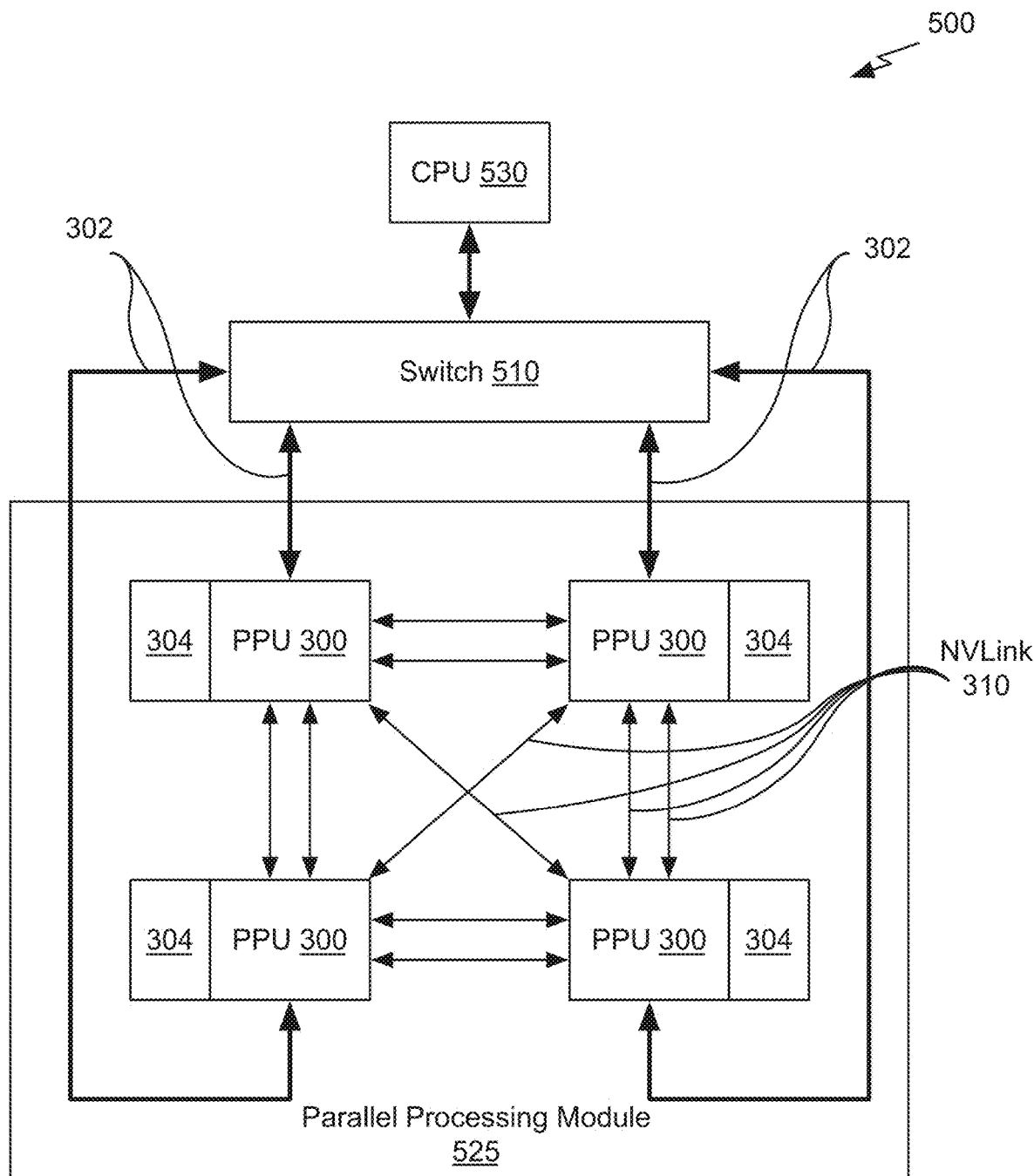
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement one or more of the methods 150, 250, 650, and 675 shown in FIGS. 1C, 2C, 6C, and 6D, respectively. The processing system 500 includes a CPU 530, switch 510, and multiple PPUs 300, and respective memories 304. The PPUs 330 may each include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
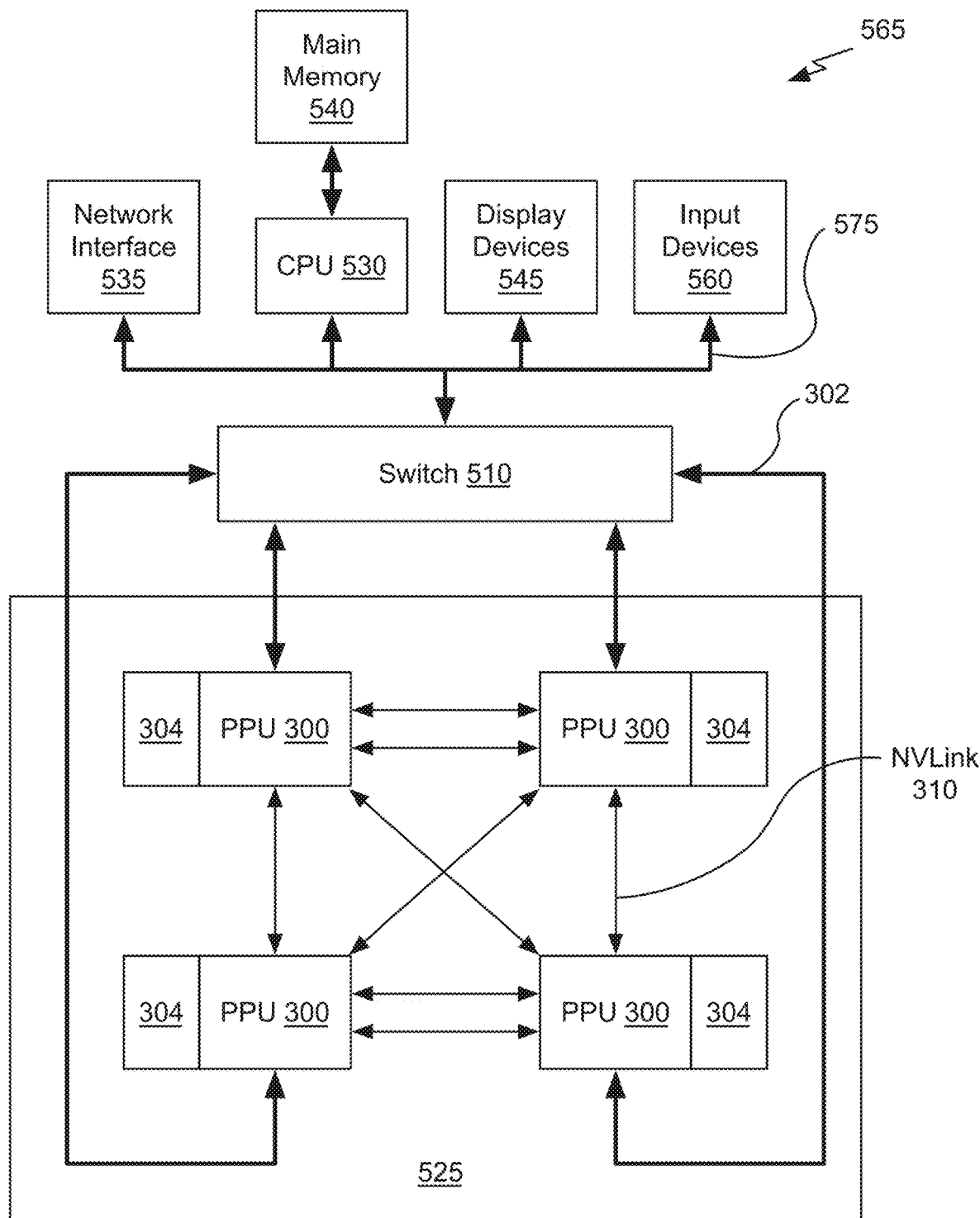
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement one or more of the methods 150, 250, 650, and 675 shown in FIGS. 1C, 2C, 6C, and 6D, respectively.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include input devices 560 such as accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5B and/or exemplary system 565 of FIG. 5C—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more WANs, one or more LANs, one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it to get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5D:
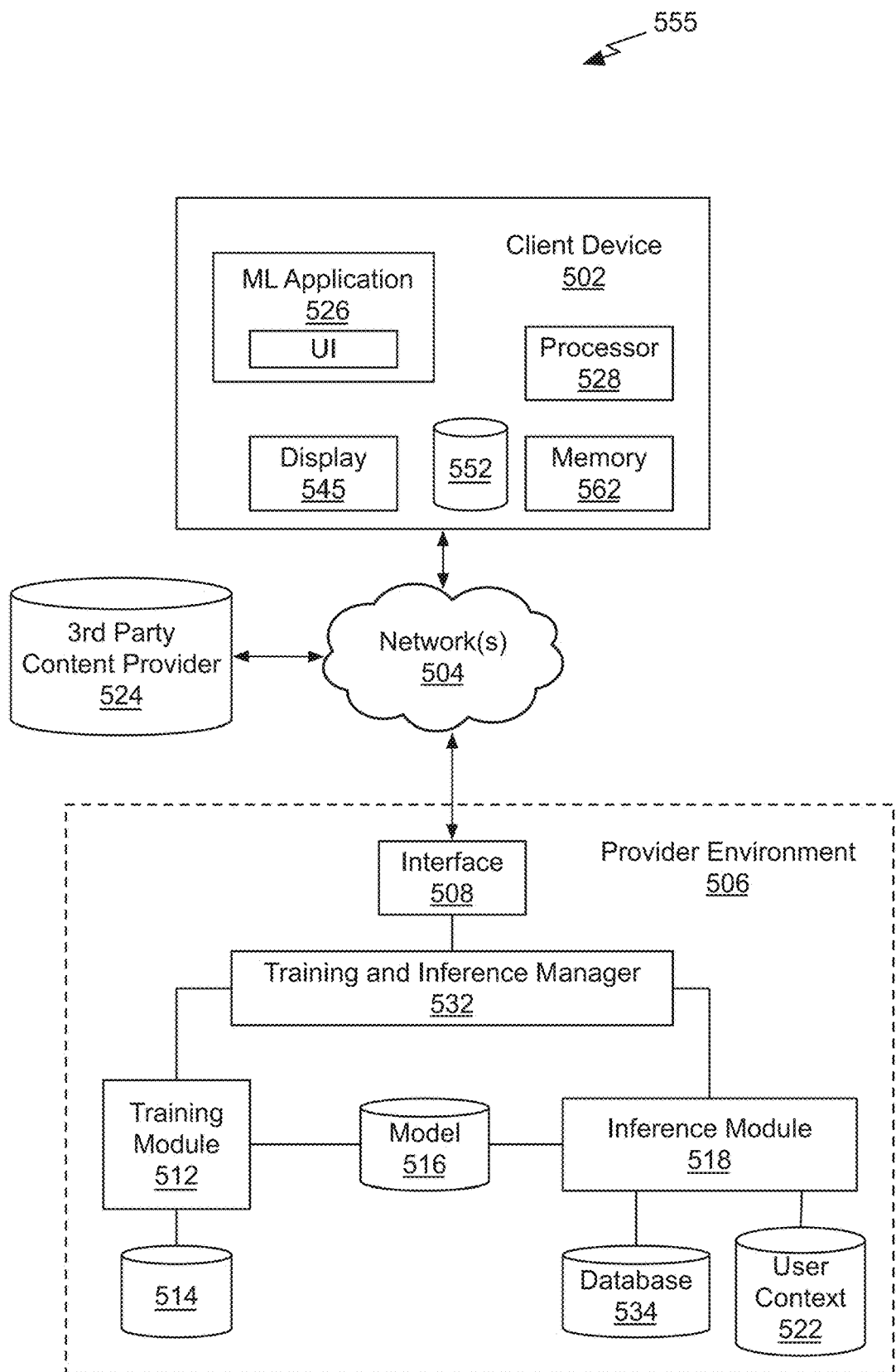
FIG. 5D illustrates components of an exemplary system that can be used to train and utilize machine learning, for use in implementing some embodiments of the present disclosure.

FIG. 5D illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device 502 may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include the Internet, an intranet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or, for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

GAN Assisted Video Encoding and Reconstruction

Videoconferencing and similar applications require a great deal of bandwidth to transmit images to edge devices over the network. When adequate bandwidth is not available image and/or audio quality is compromised. Conventional image compression techniques may be employed to compress the images before transmission and decompress the images for display at the receiving device. However, the conventional techniques may not be robust when the bandwidth is extremely limited or a connection is unreliable.

In an application, such as videoconferencing (VC), where a great deal of footage is transmitted of a single subject under relatively consistent situations a generator neural network, such as the style-based generator system 100 may be used to encode an image as an intermediate latent code or an appearance vector. A synthesis neural network, such as the synthesis neural network 140 may then reconstruct the image from the appearance vector.

In an embodiment, the appearance vector includes at least one of an abstract latent code (e.g., intermediate latent code), a set of (facial) landmark points, a set of coefficients pertaining to the well-known Facial Action Coding System (FACS), or a vector representing facial appearance in a learned feature embedding space.

Images of a subject may be captured and processed to project or map each video frame into the latent space of a synthesis neural network to produce appearance vectors that are transmitted to a receiving device. The appearance vectors encode attributes of the subject and are a compressed representation of the images. The synthesis neural network operating in the latent space may be configured to render the appearance vectors to reconstruct the images at the receiver, effectively decompressing the appearance vectors. For example, during videoconferencing a subject is typically a single human under fairly steady conditions of camera, pose, and lighting. A video stream of such a person talking and listening is largely redundant, because the video frames contain only minor variations of the same person.

Furthermore, standard video broadcasting typically offers little high-level control over aspects such as appearance of the subject. In contrast, a synthesis neural network enables enhanced control, particularly the ability to decouple characteristics of a specific subject from movement of the person whose image is captured in the video frames. Therefore, using a synthesis neural network to reconstruct compressed video enables control for modifications during the reconstruction, as described further herein.

The appearance vector provides the real time information for pose, expression, etc. for the reconstructed video frames and replication data contributes the underlying characteristics of the human person whose likeness is being captured and broadcast. Replication data (e.g., weights of a trained neural network) may be determined during training and transmitted to the receiver.

The characteristics of the human subject used during training of the synthesis neural network may be applied to the reconstructed video frames—even when a different human subject appears in the captured images from which the appearance vector is generated. In other words, the replication data is transferred to the reconstructed video frames by the synthesis neural network. The replication data may be generated using the same person whose likeness is captured and broadcast, but with different attributes, such as different hair styles, clothing, and/or scene lighting. For example, the replication data for a person may be generated when the person has her hair styled as she prefers, while she is wearing a uniform, and under studio lighting conditions. In contrast, the appearance vectors may be generated while the same person has her hair styled differently, is wearing a hat or glasses, and under poor lighting conditions. The replication data will be transferred to the reconstructed images, so that she appears to have her preferred hair style, is wearing the uniform, and the images of her are captured in the studio lighting conditions. In another example, the replication data may be generated for another person and the attributes of the other person are transferred to the reconstructed images. Therefore, the replication data may be used to modify one or more aspects of the reconstructed images. In another embodiment, individual attributes that are used by the synthesis neural network for reconstruction are provided with the appearance vector. For example, the person whose image is captured may select different attributes (e.g., wearing glasses, eye color, etc.) that are broadcast to the receiver. In another example, the receiver may select one or more different attributes to be used for reconstruction.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 6A:
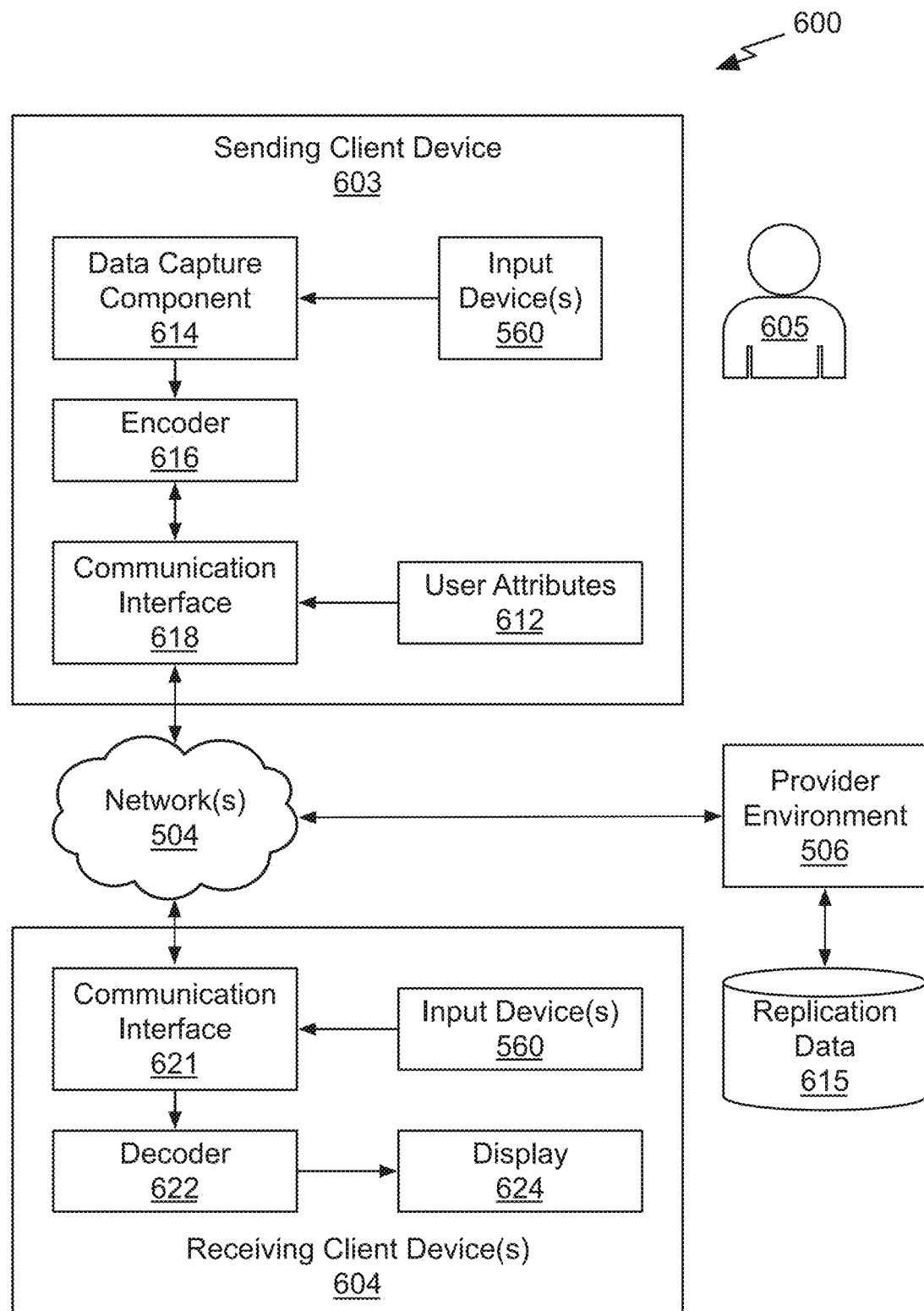
FIG. 6A illustrates an exemplary video streaming system suitable for use in implementing some embodiments of the present disclosure.

FIG. 6A illustrates an exemplary video streaming system 600 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the exemplary video streaming system 600 is within the scope and spirit of embodiments of the present disclosure.

FIG. 6A includes client devices 603 and 604 (which may include similar components, features, and/or functionality to the example processing system 500 of FIG. 5B, exemplary system 565 of FIG. 5C, and/or exemplary system 555 of FIG. 5D), and network(s) 504 (which may be similar to the network(s) described herein). In some embodiments of the present disclosure, the system 600 may include the provider environment 506 and the client devices 603 and/or 604 may each be the client device 502. Although the sending client device 603 is described as a source or sender, the sending client device 603 may be configured to simultaneously perform the operations of a destination or the receiving client device 604. Similarly, although the receiving client device(s) 604 is described as a destination or receiver, the receiving client device(s) 604 may be configured to simultaneously perform the operations of the source or sending client device 603.

In the system 600, for a video conferencing session, the receiving client device(s) 604 may capture input data using a data capture component 614. The input data may be images, audio, gaze direction, gaze location, and other types of data captured by input devices 560. The data capture component 614 provides the captured data for training an encoder 616 to project an input in an input latent space, such as the latent space $\mathcal{Z}$, into a latent space associated with a synthesis neural network, such as the intermediate latent space $\mathcal{W}$. When the data are video frames captured of a person 605, such as a person interacting with or viewing the sending client device 603, the encoder 616 is trained to produce an appearance vector for each frame. Once the encoder 616 is trained to project an input in the input latent space to an appearance vector into the latent space $\mathcal{W}$, the encoder converts the captured frames of the person 605 into appearance vectors.

Parameters (e.g., weights) of the encoder 616 are learned during training and the parameters are used to process the input latent codes when the encoder 616 is deployed to generate the appearance vectors. In an embodiment, the encoder 616 comprises the mapping neural network 110 and a decoder 622 within the receiving client device(s) 604 comprises the synthesis neural network 140 and the style conversion unit 115.

In an embodiment, the encoder 616 may produce an appearance vector for one frame and then produce appearance vector adjustments for one or more subsequent frames. In an embodiment, the encoder 616 may be configured to produce an appearance vector instead of or in addition to appearance vector adjustments for one or more frames based on a metric or at predetermined intervals.

In another embodiment, the receiving client device(s) 604 may interpolate between two appearance vectors to generate additional appearance vectors and additional reconstructed frames. The additional reconstructed frames may reconstruct more frames than were captured. The appearance vectors cause the decoder 622 to reconstruct different images can be thought of as vectors in a high-dimensional space, and these "key" appearance vectors can be interpolated to produce appearance vectors whose corresponding images are "in between" the reconstructed frames corresponding to the "key" appearance vectors. A successfully trained decoder 622 tends to have a "smoother" latent space, in which interpolated appearance vectors faithfully capture a smooth and natural visual transition between the captured images.

When the sending client device 603 does not generate an appearance vector for each captured image, the additional reconstructed frames may reconstruct the frames for which appearance vectors were not generated. A slow-motion effect may be achieved by reconstructing the additional frames. When one or more appearance vectors are corrupted or dropped (due to network congestion, etc.) and not received by the receiving client device 604, the additional reconstructed frames may reconstruct the frames for the missing appearance vectors. Furthermore, one or more of the appearance vectors and appearance vector adjustments may be compressed by the sending client device 603 and decompressed by the receiving client device(s) 604 using conventional techniques.

The appearance vectors (or appearance vector adjustments) are transmitted by the sending client device 603 to the receiving client device(s) 604 via the network(s) 504. The sending client device 603 may also transmit replication data 615 to the receiving client device(s) 604 via the networks(s) 504. In an embodiment, the replication data 615 is stored in a secure manner in the storage coupled to the provider environment 506 (as shown in FIG. 6A) and/or in the sending client device 603. In an embodiment, the person 605 may select one or more individual user attributes 612 that are transmitted to the receiving client device(s) 604 for reconstruction.

In an embodiment, the replication data 615 for a specific subject, such as the person 605, is generated by training a synthesis neural network. The specific subject may be a real or synthetic character including humans and/or computer-generated avatars such as humans, animals, creatures, etc. Training data may include frames of rendered or captured video that include the subject. The synthesis neural network may be trained with video frames of the specific subject's face rather than with images of many different people's faces. In an embodiment, the training may start with a pre-trained synthesis neural network that has been trained on many different people's faces, followed by fine-tuning with video frames of the specific subject's face.

The replication data 615 may be generated in advance or generated and/or updated continuously or periodically updated when additional training is performed. In an embodiment, the sending client device 603 may continuously train the synthesis neural network using the generative adversarial network 270 configuration shown in FIG. 2D to refine the replication data 615 associated with the person 605. In an embodiment, in addition to the encoder 616, the sending client device 603 also includes the decoder 622; captured images of the person 605 may be compared with reconstructed images produced from the appearance vectors by the decoder 622 within the sending client device 603. The replication data 615 is then changed to reduce differences between the reconstructed images generated within the sending client device and the captured images. In another embodiment, the replication data 615 is changed by the provider environment 506 when the captured images are also available and the provider environment 506 implements the GAN 270 training framework shown in FIG. 2D to perform continuous or periodic training.

The receiving client device 604 may receive the appearance vectors and replication data 615 via the communication interface 621 and the decoder 622 may reconstruct the images encoded by the appearance vectors according to the replication data 615. The receiving client device 604 may then display the reconstructed images via the display 624. In an embodiment, the receiving client device(s) 604 also receives one or more user attributes 612 that also influence the reconstructed images. The decoder 622 may comprise at least the synthesis neural network 140, an instance of the synthesis neural network trained to produce the replication data 615, or another synthesis neural network.

In an embodiment, the synthesis neural network 140, reconstructs highly realistic 1024×1024 pixel images from a latent code of 512 16-bit floating-point numbers. In another embodiment, the latent code includes less than 512 numbers in a floating-point or integer format. The latent codes are transmitted by the sending client device 603 to the receiving client device 604 and used to synthesize a video stream of the person 605. Sending the latent codes, which comprise 8 kilobits per generated frame, at 30 or 60 FPS represents 240 or 480 Kbps—a fraction of the bandwidth normally required for a megapixel video stream.

Figure 6B:
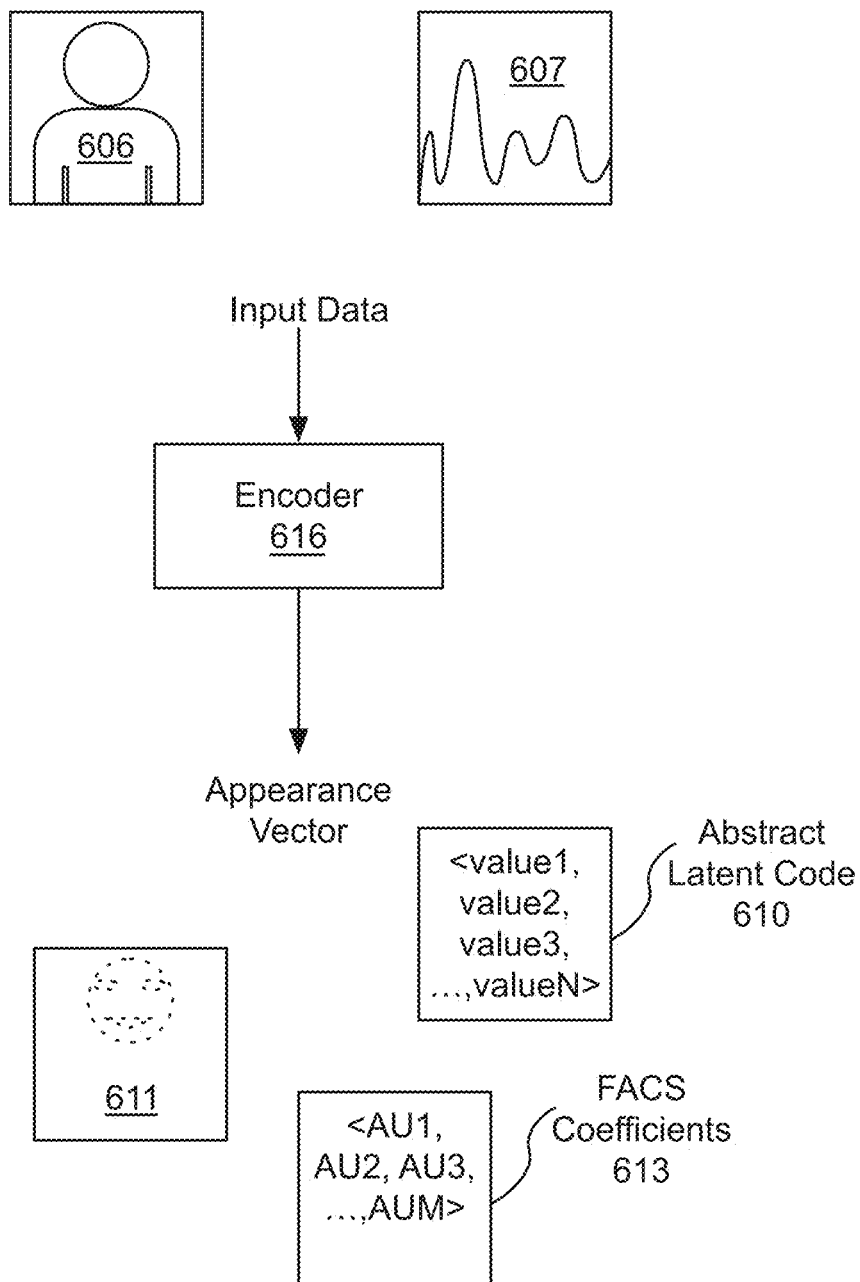
FIG. 6B illustrates a variety of appearance vectors for use in implementing some embodiments of the present disclosure.

FIG. 6B illustrates a variety of appearance vectors for use in implementing some embodiments of the present disclosure. The input data may be an image 606, audio 607, gaze direction, gaze location, and other types of data captured by input devices 560. The encoder 616 processes the input data to generate an appearance vector. The appearance vectors encode attributes of the input data and are a compressed representation of the input data. In an embodiment, the appearance vector includes at least one of an abstract latent code 610 (e.g., intermediate latent code), a set of (facial) landmark points 611, a set of FACS coefficients 613, or a vector representing facial appearance in a learned feature embedding space.

Figure 6C:
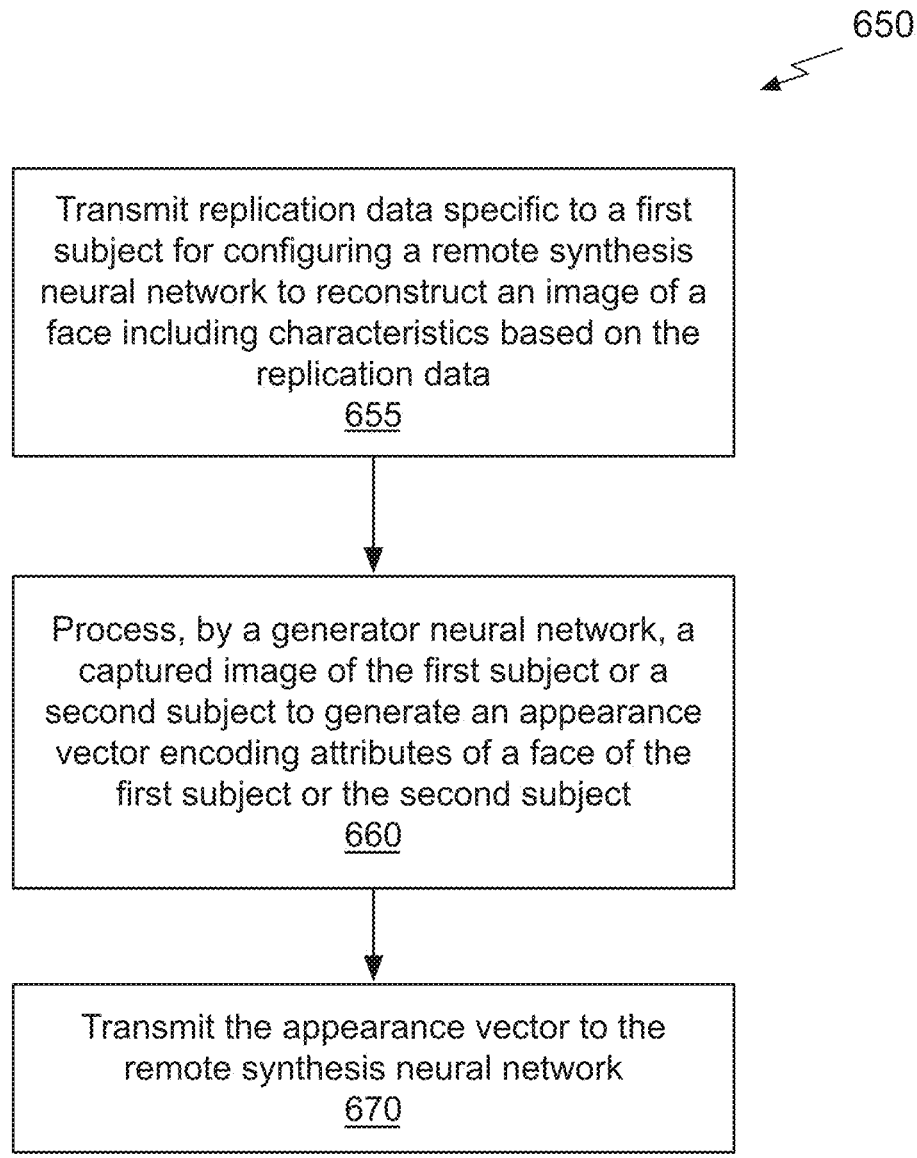
FIG. 6C illustrates a flowchart of a method for GAN-assisted video compression, in accordance with an embodiment.

FIG. 6C illustrates a flowchart of a method 650 for GAN-assisted video compression, in accordance with an embodiment. Each block of method 650, described herein, comprises a computing process that may be performed using any combination of hardware, firmware, and/or software. For instance, various functions may be carried out by a processor executing instructions stored in memory. The method 650 may also be embodied as computer-usable instructions stored on computer storage media. The method may be provided by a standalone application, a service or hosted service (standalone or in combination with another hosted service), or a plug-in to another product, to name a few. In addition, method 650 is described, by way of example, with respect to the system of FIG. 6A. However, this method may additionally or alternatively be executed by any one system, or any combination of systems, including, but not limited to, those described herein. Furthermore, persons of ordinary skill in the art will understand that any system that performs method 650 is within the scope and spirit of embodiments of the present disclosure.

At step 655, replication data 615 specific to a first subject is transmitted for configuring a remote synthesis neural network to reconstruct an image of a face including characteristics based on the replication data 615. In an embodiment, the remote synthesis neural network is within a client device, such as the receiving client device(s) 604. In an embodiment, the remote synthesis neural network comprises the decoder 622.

At step 660, a generator neural network processes a captured image of the first subject or a second subject to generate an appearance vector encoding attributes of a face of the first subject or the second subject. The first and second subjects may each be a real or synthetic character including humans and/or computer-generated avatars such as humans, animals, creatures, etc. In an embodiment, the generator neural network comprises a mapping neural network, such as the mapping neural network 110. In an embodiment, the generator neural network comprises a mapping neural network and a synthesis neural network. In an embodiment, the abstract latent code is processed by the synthesis neural network to produce a predicted image of the face of the first subject. In an embodiment, the generator neural network is trained to produce a predicted image of the first subject that is compared with the captured image of the first subject to learn the replication data 615. In an embodiment, the predicted image is compared with the captured image and parameters of the generator neural network are updated to reduce differences between the predicted image and the captured image. In an embodiment, the abstract latent code is incrementally updated based on the differences and is processed by the synthesis neural network to predict a subsequent image of the face.

In an embodiment, the attributes comprise head pose and facial expression. In an embodiment, the appearance vector is a compressed encoding of the face. In an embodiment, the appearance vector comprises an abstract latent code, such as the intermediate latent code and/or one or more style signals. In an embodiment, the appearance vector encodes at least one additional attribute associated with clothing, hairstyle, or lighting. The at least one additional attribute may be derived from the captured images or a sensor. In an embodiment, the appearance vector comprises a latent code of 512 16-bit floating-point numbers.

In an embodiment, the appearance vector further comprises attributes of an additional portion of the first subject or the second subject and the remote synthesis neural network is further configured to reconstruct the image to include the additional portion. The additional portion may include at least one of a shoulder, neck, an arm, or a hand.

In an embodiment, facial landmark points are detected in the captured image and used to generate the appearance vector. In an embodiment, the abstract latent code is computed by transforming facial landmark points according to a learned or optimized matrix. In an embodiment, the optimized matrix is implemented by a neural network that learns the optimized matrix. In an embodiment, the abstract latent code is compared with a predicted abstract latent code computed by transforming facial landmark points according to a learned or optimized matrix. The matrix is updated to reduce differences between the abstract latent code with a predicted abstract latent code. In an embodiment, the abstract latent code is processed by a synthesis neural network to produce a predicted image of the face of the first subject, the predicted image is compared with the captured image, and the matrix is updated to reduce differences between the predicted image and the captured image. In an embodiment, the generator neural network comprises a mapping neural network and facial landmark points detected in the captured image are input to the mapping neural network to compute the abstract latent code. In an embodiment, the predicted image paired with the facial landmark points is compared with the captured image paired with the facial landmark points to produce differences and parameters of the generator neural network updated to reduce the differences.

At step 670, the appearance vector is transmitted to the remote synthesis neural network. In an embodiment, the appearance vector is transmitted to the remote synthesis neural network during a videoconferencing session. In an embodiment, the captured image is a frame of a video and the generator neural network is configured to generate appearance vector adjustment values for each additional frame of the video corresponding to additional captured images.

Figure 6D:
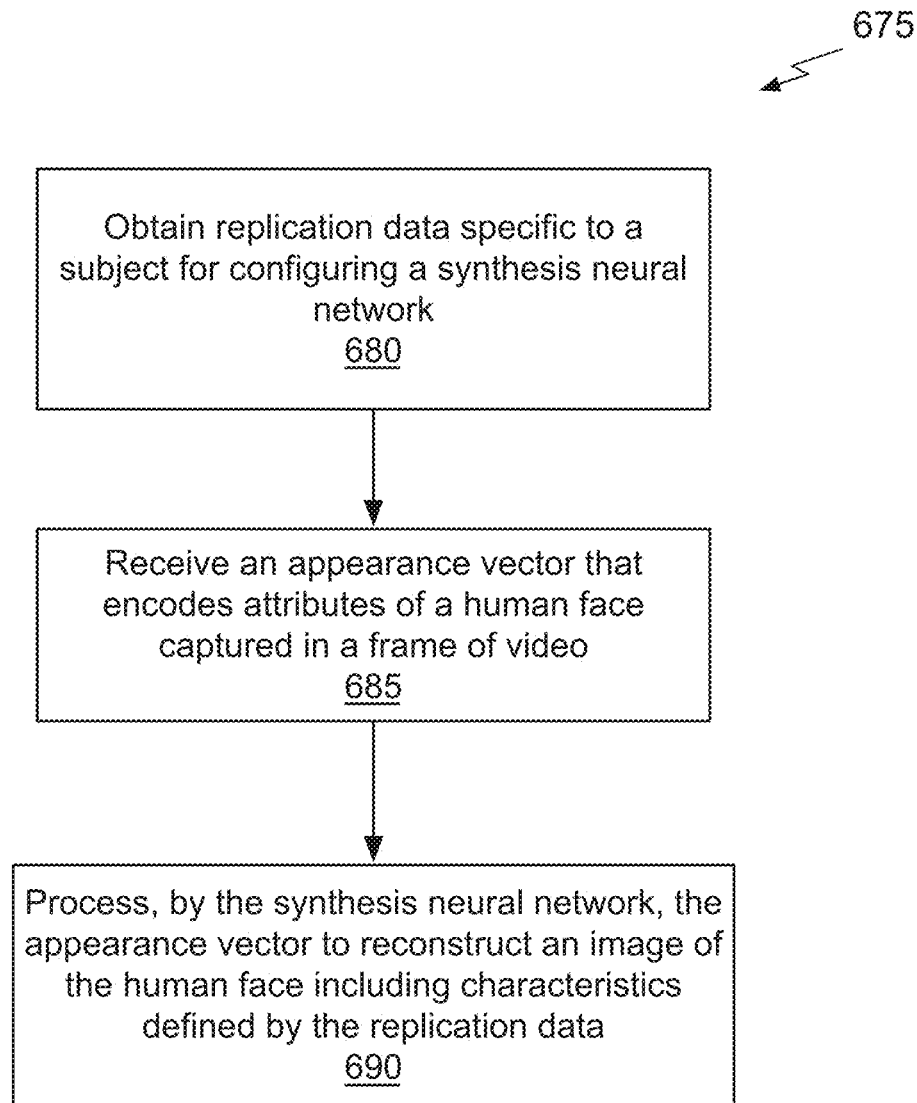
FIG. 6D illustrates a flowchart of a method for GAN-assisted video reconstruction, in accordance with an embodiment.

FIG. 6D illustrates a flowchart of a method 675 for GAN-assisted video reconstruction, in accordance with an embodiment. At step 680, replication data 615 specific to a subject is obtained for configuring a synthesis neural network. In an embodiment, the decoder 622 comprises the synthesis neural network. The subject may be a real or synthetic. In an embodiment, the replication data 615 comprises weights learned during training of the synthesis neural network.

At step 685, an appearance vector is received that encodes attributes of a human face captured in a frame of video. In an embodiment, the human face is a face of the person 605. In another embodiment, the human face is not the face of the person 605. For example, the replication data 615 may represent characteristics of a subject, such as an elf avatar. During a videoconferencing session, the appearance vectors are processed by the decoder 622, to reconstruct an image of the human face of the person 605 including the characteristics defined by the replication data 615. In other words, a viewer of the reconstructed images at the display 624 sees an elf avatar with expressions and poses matching that of the person 605.

In an embodiment, the appearance vector is a compressed encoding of the human face of the person 605. In an embodiment, appearance vector adjustment values are received for each additional frame of the video. In an embodiment, each appearance vector adjustment is successively applied to the appearance vector to reconstruct additional images of the human face for each additional frame of the video including the characteristics.

At step 690, the synthesis neural network processes the appearance vector to reconstruct an image of the human face including characteristics defined by the replication data. In an embodiment, the reconstructed image of the human face is displayed in a viewing environment, where the synthesis neural network reconstructs the image according to lighting in the viewing environment. For example, instead of using a lighting attribute encoded in the appearance vector and/or the replication data 615, the synthesis neural network reconstructs the image based on lighting in the environment in which the reconstructed images are displayed. In an embodiment, the lighting or other information may be provided by a sensor.

Figure 7A:
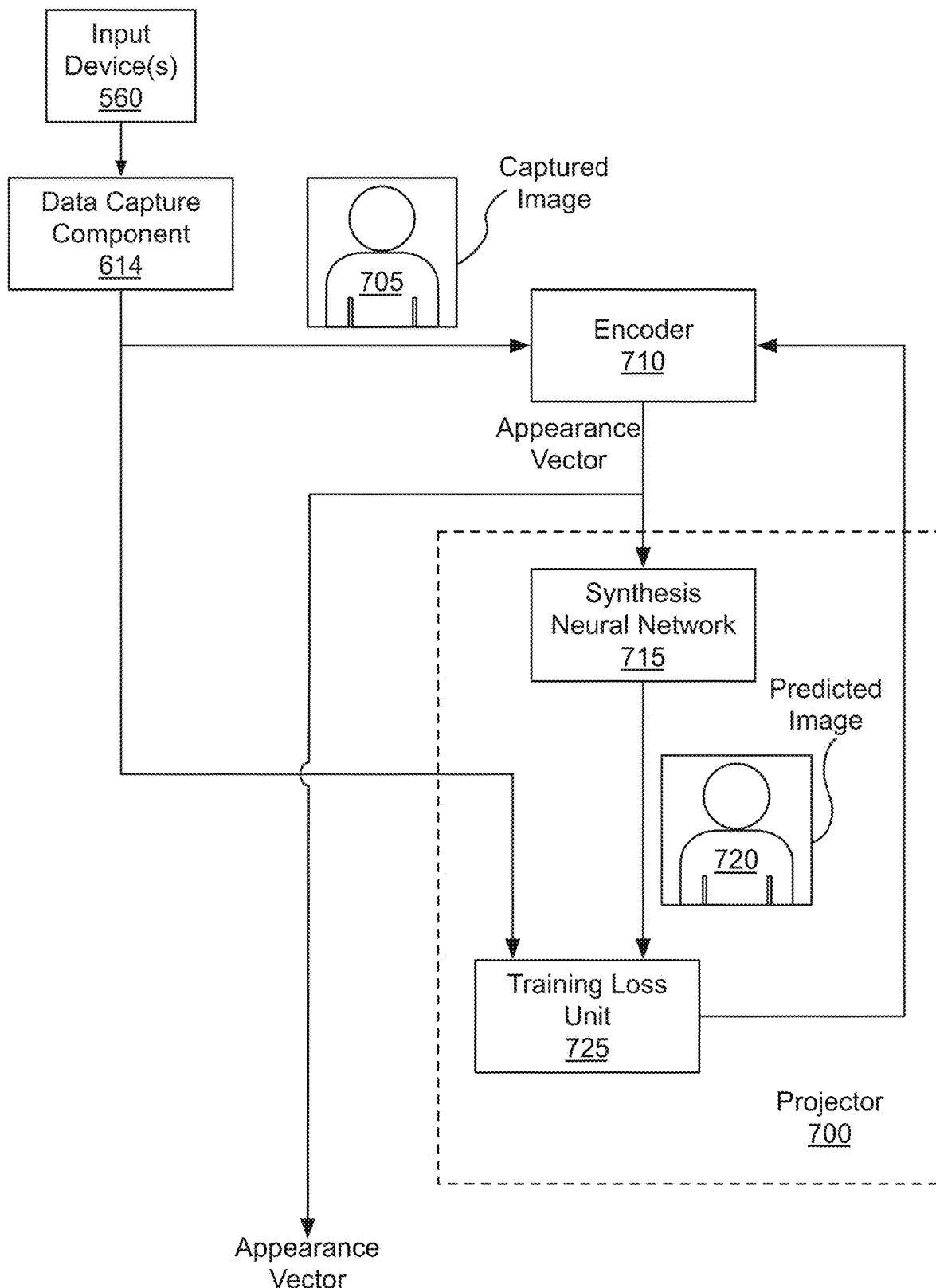
FIG. 7A is a conceptual diagram of a synthesis neural network training configuration, for use in implementing some embodiments of the present disclosure.

FIG. 7A is a conceptual diagram of a synthesis neural network training configuration including a projector 700, for use in implementing some embodiments of the present disclosure. In an embodiment, an encoder 710 and a synthesis neural network 715 is trained according to a GAN objective using the generative adversarial network 270 configuration shown in FIG. 2D to produce appearance vectors for images and reconstruct the images, respectively. The synthesis neural network 715 and encoder 710 may then be jointly trained using the configuration shown in FIG. 7A. The trained encoder 710 and synthesis neural network 715 may be deployed as the encoder 616 and decoder 622, respectively, for use during real time videoconferencing.

In an embodiment, the projector 700 is implemented within the sending client device 603 and is used to improve the quality of the appearance vectors generated by the sending client device 603. The projector 700 mimics the operation of the receiving client device(s) 604 by including the synthesis neural network 715. The decoder 622 may be an instance of the synthesis neural network 715. As previously described, the encoder 616 may perform a projection to map each captured image of the person 605 to produce an appearance vector. The synthesis neural network 715 reconstructs a predicted image 720 from the appearance vector.

A training loss unit 725 compares the predicted images 720 with the corresponding captured images 705 to identify differences between the predicted images 720 and the captured images 705. In an embodiment, the training loss unit 725 may use a learned perceptual image patch similarity (LPIPS) technique to identify the differences in pixel values between corresponding image patches. The training loss unit 725 updates parameters (e.g., weights) of the encoder 710 to reduce differences between the predicted images 720 and the captured images 705. In an embodiment, the training loss unit 720 is configured to update the parameters used by the synthesis neural network 715, thereby updating the replication data 615 for the subject in the captured image.

During inferencing, when the decoder 622 within the receiving client device(s) 604 reconstructs images based on appearance vectors received from the sending client device 603, the sending client device 603 may continue to operate the projector 700 to continuously improve performance of the encoder 710 and/or the synthesis neural network 715. In this manner, the encoder 710 and/or synthesis neural network 715 may be "trained" during inferencing using many more captured images with a wider variety of different attributes. Continuing to update only the parameters of the synthesis neural network 715 within the encoder 710 does not affect the quality of the appearance vectors. The sending client device 603 may be configured to update the replication data 615 and/or parameters of the decoder 622 as the performance of the synthesis neural network 715 improves so that performance of the decoder 622 may also improve.

Rather than performing a projection to map each captured image 705 to produce an appearance vector, the encoder 710 instead initially performs a projection to produce a first appearance vector for a first captured image. After the first captured image, the encoder 710 may use the first appearance vector as an input from which to produce a second appearance vector. When the projection operation is computationally intensive, predicting the appearance vector from the previous appearance vector may be computationally efficient, enabling real-time performance. Using the previous appearance vector to perform an incremental projection, may improve performance in terms of computation speed and image quality because adjacent video frames are often similar. Instead of beginning at an arbitrary point in latent space, the projection operation begins from the latent vector produced by the projection algorithm for the previous frame. The encoder 710 effectively performs a local search instead of a global search to produce the subsequent appearance vectors. Incremental projection may also produce more temporally coherent resulting video, reducing flicker or frame-to-frame distortions caused by different choices in the global search leading to different, nearly-equivalent points in latent space for each frame.

In an embodiment, the projector 700 generates correction data for each appearance vector, where the correction data is computed based on a comparison between the predicted image 720 and the captured image 705. The predicted image 720 may be used as an additional macroblock prediction scheme available to a traditional encoder such as the H.265 high efficiency video coding (HEVC) format encoder. In an embodiment, when the receiving client device 604 only supports conventional video encoded data, the sending client device 603 may generate conventionally encoded video data that can be decoded by the receiving client device 604.

In an embodiment, when a significant change occurs in the captured image compared with a previous captured image, a projection operation may be performed to map another appearance vector for the captured image and then resume incremental projections. A confidence metric may be computed to determine when the significant change occurs. For example, the confidence metric may indicate a number of pixels that are changed in the captured image compared with the previous captured image. The projection operation may be initiated when the confidence metric is greater than a threshold value. In another embodiment, the confidence metric may be evaluated for predicted images or comparing corresponding predicted and captured images. In an embodiment, the receiving client device 604 (e.g., remote synthesis neural network) may request an appearance vector generated via the projection operation. The client device 604 may initiate the request based on evaluation of a confidence metric computed for reconstructed images.

Figure 7B:
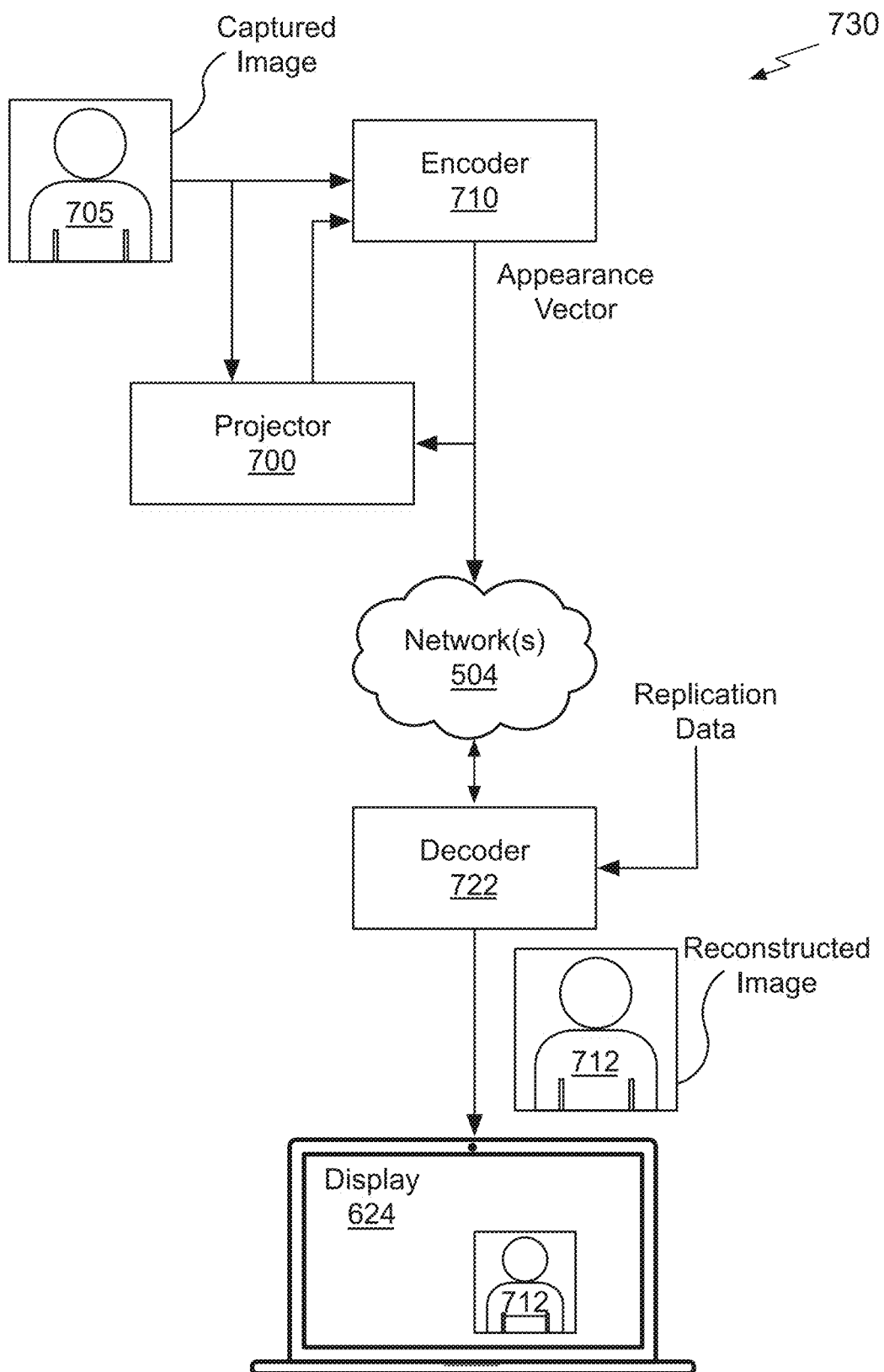
FIG. 7B is a conceptual diagram of an end-to-end system including the projector of FIG. 7A, for use in implementing some embodiments of the present disclosure.

FIG. 7B is a conceptual diagram of an end-to-end system 730 including the projector 700 of FIG. 7A, for use in implementing some embodiments of the present disclosure. The system 730 includes at least a sending client device 603 and a receiving client device 604. The encoder 710 is within the sending client device 603 and generates the appearance vectors that are transmitted through the network(s) 504 to the decoder 722 within the receiving client device 604. The decoder 722 may be an instance of the synthesis neural network 715. The decoder 722 processes the appearance vectors according to the replication data to produce reconstructed images 712. The reconstructed images 712 may then be displayed to a viewer at the display 624. The replication data may be selected by the person in the captured images 705 or the viewer.

Figure 7C:
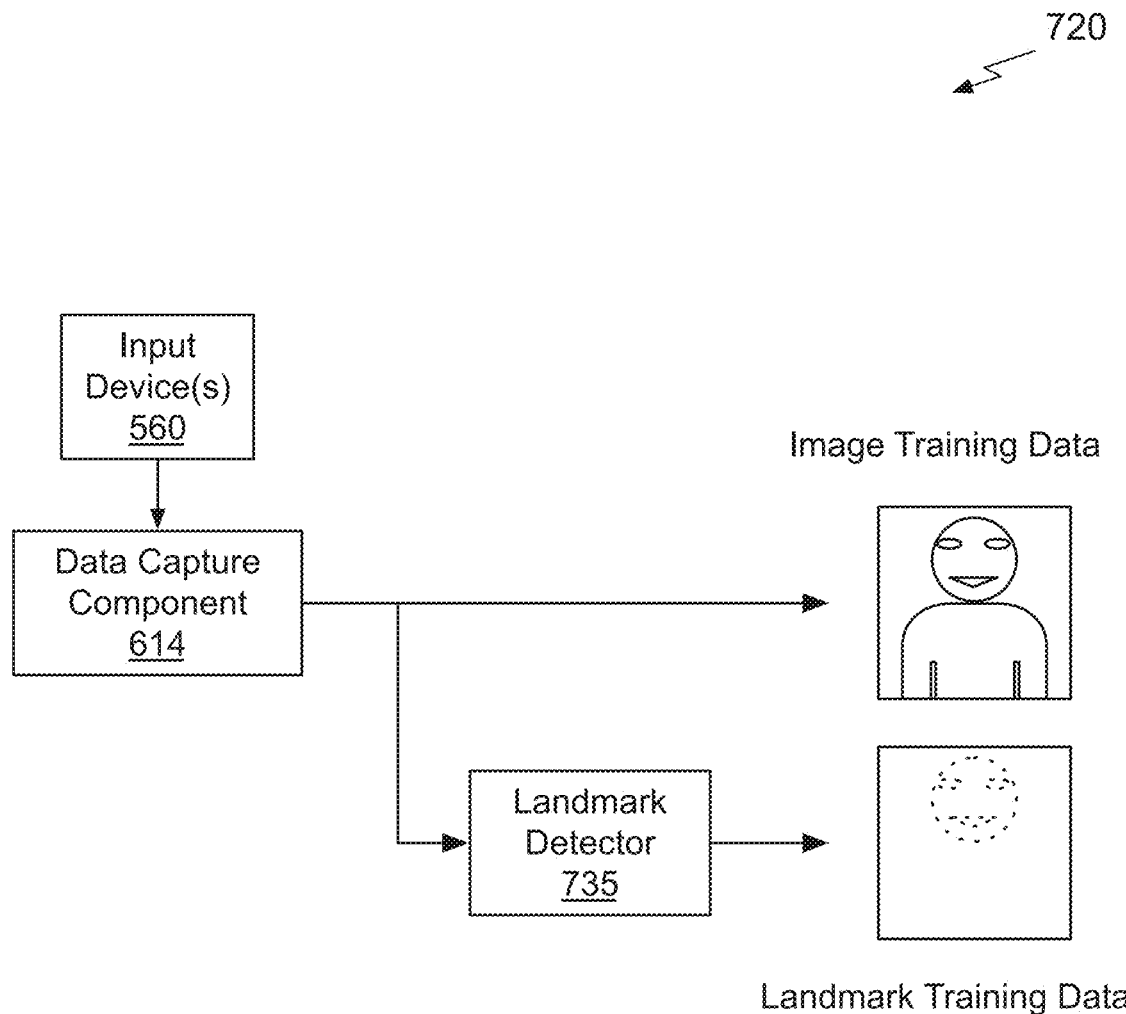
FIG. 7C is a conceptual diagram of a configuration for generating training data, for use in implementing some embodiments of the present disclosure.

FIG. 7C is a conceptual diagram of a configuration for generating training data, for use in implementing some embodiments of the present disclosure. An alternative to using projection to generate a latent code is to convert facial landmark points into a latent code using a matrix, or a neural network. When facial landmark points are used, parameters of the matrix or weights of the neural network are learned using landmark training data. The facial landmark points may be extracted from the captured images by a landmark detector 735 to produce landmark training data. The landmark detector 735 may be implemented using conventional computer vision techniques or neural analysis techniques. The facial landmark points delineate the position of key points on the face (edges of eyelids and lips, center of pupils, bridge of nose, etc.) and capture the important movements and deformations of a face. The landmark detector 735 may be used to detect other types of landmarks, including facial landmarks that are not limited to image space. For example, the landmarks may be a set of coefficients pertaining to the Facial Action Coding System (FACS), other attributes of facial appearance, or a vector representing facial appearance in a learned feature embedding space. FACS defines a set of facial muscle movements that correspond to a displayed emotion.

The extracted facial landmark points may be used as appearance vectors, used to produce the appearance vectors, or provided separately from the appearance vectors. In general, different sets of training data may be used to generate replication data for different subjects (real and synthetic). Furthermore, different sets of training data may be used to generate different replication data for the same subject where attributes that vary from day-to-day or session-to-session, such as a person's clothing, hairstyle, and variations due to makeup, lighting, etc. are specific to each replication data.

Figure 7D:
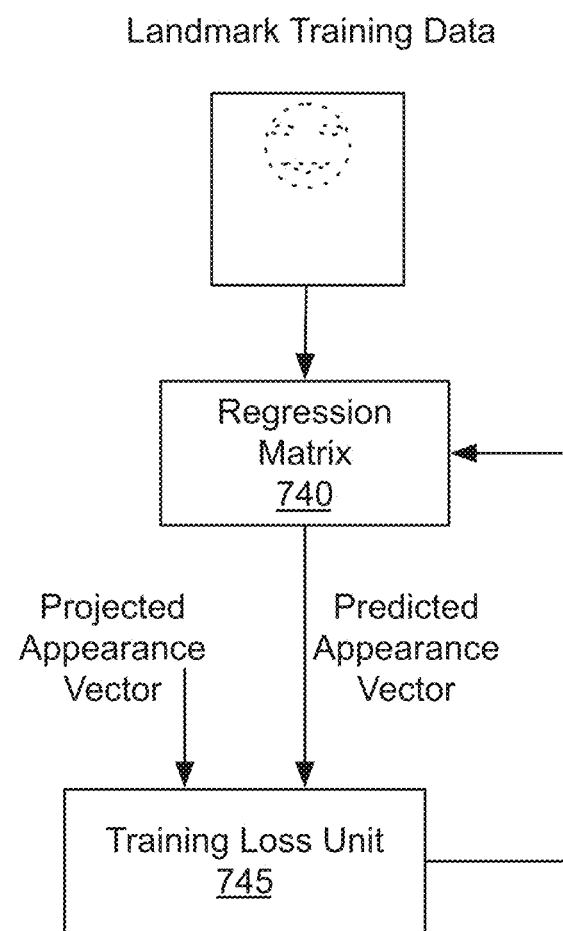
FIG. 7D is a conceptual diagram of a training configuration using landmarks to predict appearance vectors, for use in implementing some embodiments of the present disclosure.

FIG. 7D is a conceptual diagram of a training configuration using facial landmark points to predict appearance vectors, for use in implementing some embodiments of the present disclosure. In an embodiment, linear regression is used to learn or optimize a matrix that transforms the vector of facial landmark points into an appearance vector (e.g., latent code vector). Using facial landmarks to produce appearance vectors may be more resilient to variations between training images and real time captured images (different hairstyle, different clothing, etc.) compared with projecting the captured images to produce the appearance vectors.

The landmark training data is transformed by a regression matrix 740 into the latent space associated with a synthesis neural network or decoder 722 within a receiving client device 604. Specifically, the facial landmark points for each training image are translated according to the regression matrix or a neural network to produce predicted appearance vectors. A training loss unit 745 compares projected appearance vectors generated by the trained encoder 710 with the predicted appearance vectors and updates parameters of the regression matrix to reduce differences between the projected and the predicted appearance vectors.

Figure 7E:
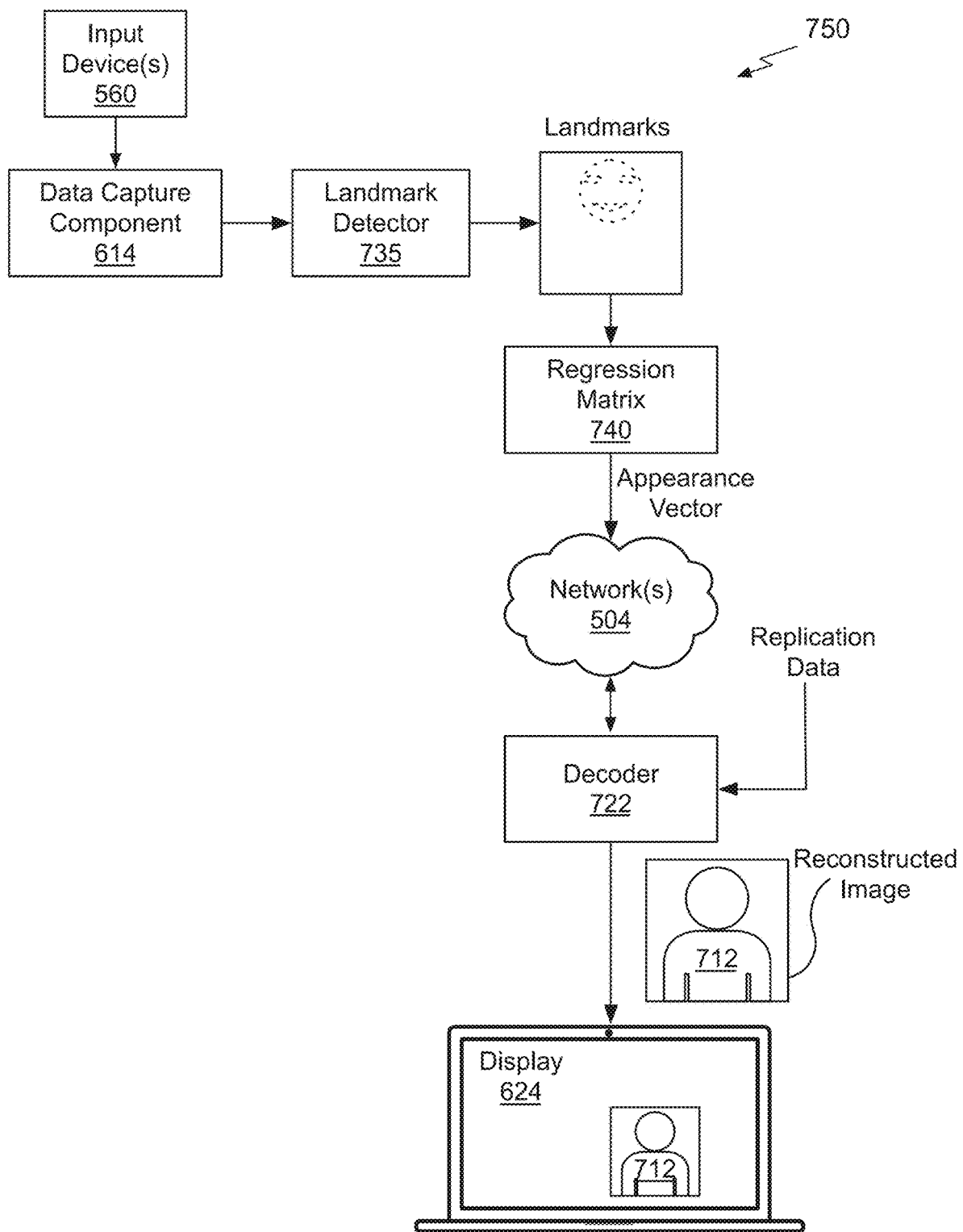
FIG. 7E is a conceptual diagram of another end-to-end system including the synthesis neural network, for use in implementing some embodiments of the present disclosure.

FIG. 7E is a conceptual diagram of an end-to-end system 750, for use in implementing some embodiments of the present disclosure. The system 750 includes at least a sending client device 603 and a receiving client device 604. The landmark detector 735 is within the sending client device 603 and generates the appearance vectors that are transmitted through the network(s) 504 to the decoder 722 within the receiving client device 604. The decoder 722 may be an instance of the synthesis neural network 715. The decoder 722 processes the appearance vectors according to the replication data to produce reconstructed images 712. The reconstructed images 712 may then be displayed to a viewer at the display 624. The replication data may be selected by the person in the captured images 705 or the viewer.

In an embodiment, instead of transmitting the appearance vectors to the decoder 722, the sending client device 603 may instead transmit the detected landmarks for each captured image. In such an embodiment, the regression matrix 740 is included within the receiving client device 604 and processes the detected landmarks to produce the appearance vectors within the receiving client device 604. Parameters used by the regression matrix 740 that are learned during training may be provided to the receiving client device 604 along with the replication data.

Conventional compression techniques may be applied to the appearance vector, such as by quantizing and delta-encoding the coordinates of facial landmarks. In an embodiment, when detected landmarks are used to generate the appearance vectors replication data can also be used to control characteristics of the reconstructed images compared with characteristics of the person in the captured images. Attributes of the reconstructed human subject, such as hairstyle, clothing, and/or lighting may be provided with the appearance vector or with the replication data (e.g., filters).

Because a set of landmark training data may project or transform to many different predicted appearance vectors equally well, the regression matrix that is learned by the regression matrix 740 during training may have a large "null space" in algebraic terms. In other words, there may be many regions of the high-dimensional latent space from which a reconstructed image may be generated that map well to the landmark training data. However, the reconstructed images may sometimes fail to match the captured images in ways that result in temporal artifacts. For example, the temporal artifacts may manifest as subtle but noticeable flicker or odd jerky distortions in the animation viewed by the recipient. Quality of the reconstructed images may be improved by learning the regression matrix directly to improve mapping of the facial landmarks to the latent space.

Figure 8A:
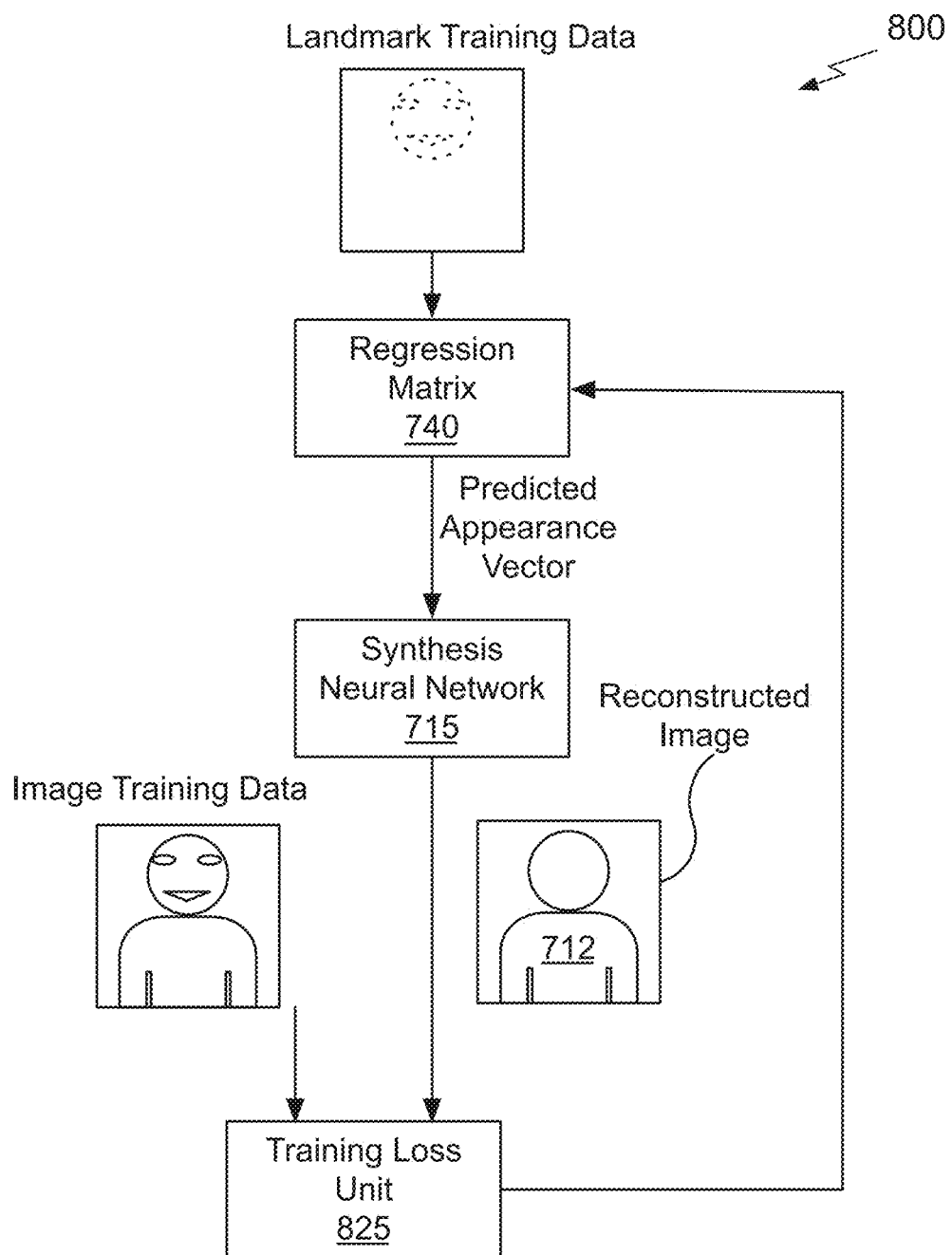
FIG. 8A is a conceptual diagram of another synthesis neural network training configuration, for use in implementing some embodiments of the present disclosure.

FIG. 8A is a conceptual diagram of an end-to-end system training configuration 800, for use in implementing some embodiments of the present disclosure. The synthesis neural network 715 may first be trained with a GAN objective using the generative adversarial network 270 configuration shown in FIG. 2D to produce appearance vectors for images and reconstruct the images, respectively. In the configuration 800, the regression matrix 740 is then jointly trained with the synthesis neural network 715 to predict appearance vectors for images and reconstruct the images, respectively. The configuration 800 may be used to perform end-to-end regression for converting facial landmarks into the appearance vectors. The trained regression matrix 740 and synthesis neural network 715 may be deployed as the encoder 710 and decoder 722, respectively, for use during real time videoconferencing.

A training loss unit 825 compares the reconstructed images with the image training data to identify differences between the reconstructed images and the image training data. In an embodiment, the training loss unit 825 may use a LPIPS technique to identify the differences. The training loss unit 825 updates parameters of the regression matrix 740 to reduce differences between the reconstructed images with the image training data. In an embodiment, the training loss unit 825 is configured to update the parameters used by the synthesis neural network 715, thereby updating the replication data for the subject in the captured image.

Figure 8B:
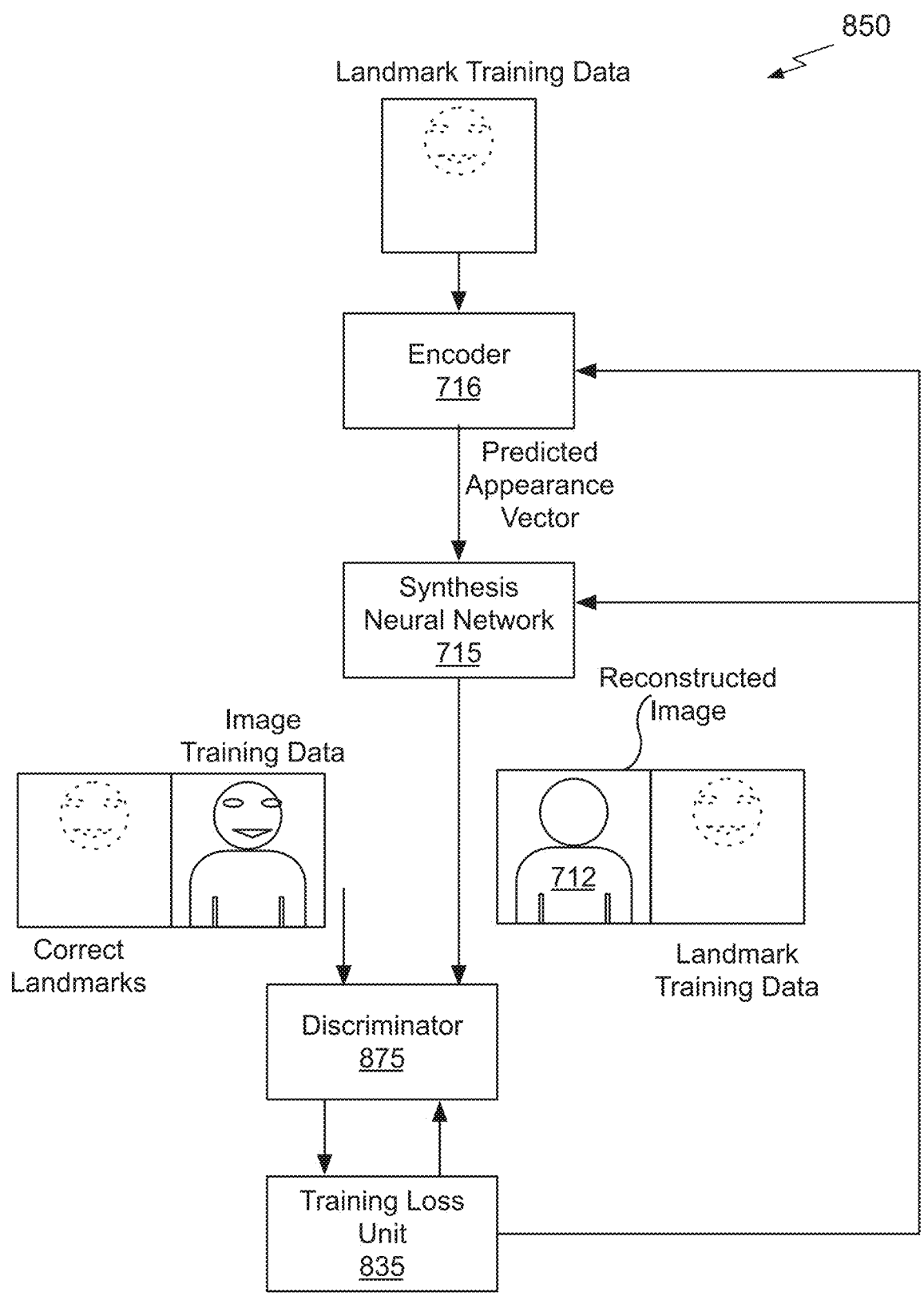
FIG. 8B is a conceptual diagram of yet another synthesis neural network training configuration, for use in implementing some embodiments of the present disclosure.

FIG. 8B is a conceptual diagram of an end-to-end system training configuration 850, for use in implementing some embodiments of the present disclosure. The configuration 850 may be used to jointly train an encoder 716 to convert facial landmarks into the appearance vectors and the synthesis neural network 715 using a conditional GAN objective. The generative adversarial network 270 configuration shown in FIG. 2D may be used with the encoder 716 and the synthesis neural network 715 to predict appearance vectors for images and reconstruct the images, respectively. The discriminator neural network 875 determines if the reconstructed images paired with the landmark training data that is also input to the encoder appears similar to the image training data paired with the correct landmarks. Based on the determination, a training loss unit 835 adjusts parameters of the discriminator 875, the synthesis neural network 715, and/or the encoder 716 are adjusted. Once the synthesis neural network 715 is trained with the conditional GAN objective, the encoder 716 and/or synthesis neural network 715 may be used during real time videoconferencing. The trained encoder 716 and synthesis neural network 715 may be deployed as the encoder 616 and decoder 622, respectively.

In an embodiment, the synthesis neural network 715 is configured to produce a foreground portion of each reconstructed image that is separate from a background portion. The foreground portion comprises at least the face portion of the reconstructed image and may also include the shoulders and other parts of the person's body that appear in the captured images. The synthesis neural network 715 may also be configured to generate an alpha mask (channel) or matte indicating the separate foreground and background portions. In an embodiment, the receiving client device(s) 604 may composite the foreground portions of the reconstructed images of the head and face onto arbitrary backgrounds or either modify or remove the background portions entirely.

During training, the foreground portion and alpha mask for each reconstructed image may be shifted randomly with respect to the background portion before they are composited to produce the reconstructed image which the discriminator neural network 875 receives and evaluates for realism. The effect is to train the synthesis neural network 715 to produce high-quality alpha masks. The relative displacements (via shifting) are a simple and robust technique to cause the discriminator neural network 875 to assign a high realism score after the randomly shifted portions are composited. The relative displacements may also enhance the ability of the encoder 716 and/or synthesis neural network 715 (e.g., generator neural network) to disentangle the background, pose, and texture attributes of the reconstructed images, and improve the usefulness of the generator neural network. Similar techniques may be used to encourage the synthesis neural network 715 to segment out and composite other aspects of the person 605 captured in the images, such as clothing or hands and arms used in gestures.

In an embodiment, the encoder 616, 710, or 716 is configured to separate at least the face in the captured image from background image data (e.g., background portion), the background image data is encoded, and the encoded background image data is transmitted from the sending client device 603 to be combined by the receiving client device(s) 604 with the reconstructed image of the human face. In an embodiment, the background image data is compressed using conventional techniques by the sending client device 603 for transmission to the receiving client device(s) 604. In an embodiment, the bandwidth needed to transmit the background image data is reduced by operating the synthesis neural network 715 in the sending client device 603 and removing regions of the background image data that are covered by the foreground portion of the reconstructed image, according to the alpha mask for the reconstructed image. Partially covered regions of the background portion may be transmitted to the receiving client device(s) 604 when high confidence exists that the background portion is changed compared with the previous reconstructed image.

In an embodiment, the attention of the discriminator neural network 875 may be focused on the semantically critical areas of the face, such as eyes, mouth, and brow. In an embodiment, the most semantically important regions of each training image are predicted, for example using hand-coded heuristics or an image saliency network trained on human gaze-tracking data. The image resolution may be artificially reduced, or the image may be otherwise perturbed, outside of the semantically important regions in some of the images input to the discriminator neural network 875. Modifying the areas outside of the semantically important regions may cause the synthesis neural network 715 to devote additional capacity to the regions of the reconstructed image that will be most important to a human viewer.

In an embodiment, audio data is incorporated into the generator neural network training configurations 800 or 850, either directly as a waveform, spectrogram, or similar low-level representation of audio, or encoded as a higher-level representation such as phonemes. When the audio data are phonemes, the phonemes may be detected in a manner similar to the facial landmarks. In an embodiment, the discriminator neural network 875 learns to judge the realism of face images in the context of a sound, phoneme, or utterance that the face is supposed to be making. The synthesis neural network 715 then learns to produce faces that correspond well with the incoming audio data. In other words, the receiving client device(s) receive audio data that may be used by the decoder 622 to reconstruct the image of the human face.

In an embodiment, the synthesis neural network 715 is augmented with memory to process the audio data. For example, the synthesis neural network 715 may be implemented using recurrent neural networks (RNNs), long short-term memories (LSTMs), and "Transformer" attention networks. Incorporating audio processing capability may be used to improve the reconstructed images, including in situations where packet loss or network quality-of-service degrades the video stream but preserves the audio data.

In an embodiment, the reconstructed images are used to improve quality of the reconstructed audio data. The extremely bandwidth-efficient appearance vector stream encodes useful "lipreading"-style information (e.g. the shape of the mouth, tongue, cheeks, the exact moment lips close and open, etc.) for improving a poor audio stream. The generator neural network may be trained to produce an improved, de-noised, source-separated, or spatialized audio stream on the receiving client device(s) 604.

The ability to control aspects of facial appearance provides an opportunity to control attributes of the reconstruction, such as gaze direction of the reconstructed face based on a viewer's gaze. A common problem with videoconferencing from a viewer's perspective is the lack of apparent eye contact. Because the camera is rarely placed near the eyes of the person whose video image is captured, conversants in a videoconference rarely feel as though they are making eye contact. Eye contact is an important social cue of engagement and the lack of eye contact has been cited as a reason people prefer in-person meetings to videoconferencing. Similarly, in multi-person videoconferencing sessions, one cannot tell who is looking at who, especially since the layout of video windows may be different on each participant's screen. Previous work has explored re-rendering eyes to create a sense of eye contact, but the manipulation of latent codes, facial landmarks, or other appearance vectors that define gaze position and/or direction may be used to increase perceived eye contact.

For example, the synthesis neural network 715 may change the brow and even head direction of the subject in the reconstructed images slightly to account for different gaze points or positions. The modifications may be coupled with a training protocol designed to encourage the synthesis neural network 715 to decouple gaze direction from other aspects such as facial identity. Because reconstruction in a videoconferencing system occurs on the receiving client device(s) 604, the videoconferencing system can exploit local knowledge about the layout of participant videos and a camera or sensor of the receiving client device(s) 604 may provide a gaze position of the viewer. The gaze position is the position on the display intersected by the viewer's gaze direction. The gaze of a subject in a reconstructed image displayed to the viewer may be modified by the decoder so that the subject appears to be looking at either a location where another reconstructed image is displayed or the gaze position of the viewer. The gaze position may be located at a reconstructed image of a subject who is speaking. The concept of manipulating apparent gaze and attention generalizes beyond videoconferencing to settings such as telepresence avatars, whose spatial relationship might appear different to different participants in the telepresence system.

In an embodiment, the reconstructed image of the human face is displayed in a viewing environment, where the synthesis neural network 715 reconstructs the image according to a gaze location of a viewer captured in the viewing environment. In an embodiment, a gaze direction of the human face in the image is towards the gaze location. In an embodiment, the appearance vector includes a gaze location corresponding to a second image viewed by the human face and a gaze direction of the reconstructed image of the human face in a viewing environment is towards the second image that is also reconstructed and displayed in the viewing environment.

The ability to modify facial appearance during reconstruction of an image enables changing the lighting. The lighting may be changed based on the replication data or environmental data from a sensor in the viewing environment. Matching the lighting in the viewing environment may present a more compelling illusion of the broadcasting subject's presence. Motion parallax may also be applied by the decoder 622 or 722 when eye tracking data for the viewer is available. In general, 3D content which is life-sized, respects motion parallax of the viewer, and mimics the lighting of the environment is qualitatively more compelling than an image without these features.

At a higher level, the social effectiveness and flow of conversation over videoconferencing may be improved by introducing asynchronous interruptions. Video conferencing today suffers from a lack of interruptions, because it is difficult to get the speaker's attention or notice when one person wants to interrupt. Also, each interruption is more disruptive to the flow of conversation, due to the unnatural lag between starting to speak and the other person hearing the interruption. A possible solution to this problem is to model the effect of an interruption in reconstructed images displayed to a first person when the first person starts to speak, anticipating the reaction of a second person viewing reconstructed images of the first person on a remote client device. The key observation is that there's a social transaction that occurs when the second person attempts to interrupt the first person during a videoconferencing session. However, to be successful, the interaction does not need to be the same for both people.

In an embodiment, style mixing may be performed by the synthesis neural network 715 or the decoder 622 or 722, using appearance vectors generated from two different captured images to produce a reconstructed image. As previously described in conjunction with FIGS. 1A, 1B, and 2B, the appearance vectors may be transformed into a set of statistical parameters, called styles, that affect the synthesis neural network 715 at different levels of a pyramidal hierarchy. For example, after training the synthesis neural network 715 to produce images of faces, the "coarse styles" that affect the 4×4 and 8×8 resolutions of the synthesis network tend to control high-level aspects of the resulting face images, such as pose, gender, hair length, while "medium styles" affecting 16×16 and 32×32 control facial identity—what makes a given person look distinctive, resemble their parents, etc.

In an embodiment, style mixing is used to change the appearance of the reconstructed images in subtle ways. For example, a frame in which the person 605 is moving quickly will be captured with motion blur, and an image that is reconstructed from the resulting appearance vector will faithfully re-create the motion blur. However, by mixing the coarse styles of each frame's corresponding appearance vector with the fine styles of a chosen frame containing no motion blur, the reconstructed images may correctly capture the movement and deformation of the person's face while also retaining fine details, appearing sharp and without motion blur. Similar mixing of styles may be used to produce videos in which a subject looks more wakeful or alert, or is wearing makeup, or certain clothes, or a particular expression.

In an embodiment, style mixing may be performed by the synthesis neural network 715 to sharpen motion blurred portions of images by combining fine style controls for a still image with coarse style controls for a blurry image. For example, the appearance vector comprises a first portion corresponding to a first frame in the video where the human face is blurry and a second portion corresponding to a second frame in the video where the human face is clearly defined. Processing by the synthesis neural network 715 combines the first portion and the second portion to reconstruct the image with the human face clearly defined by using the first portion to "control coarse styles" and the second portion to "control fine styles". In another example, when a human face captured in a frame is blurry, the synthesis neural network 715 reconstructs the image with the human face clearly defined by using the appearance vector to control coarse styles and the replication data to control fine styles.

Training and deploying the generative neural network components to encode and reconstruct images using appearance vectors, reconstruction data, and specific attribute data may provide a more engaging videoconferencing experience. The appearance vector provides the real time information for pose, expression, etc. for the reconstructed video frames and the replication data contributes the underlying characteristics of the human person whose likeness is being broadcast. Replication data (such as the weights of a trained synthesis neural network) are determined during training and transferred to the receiver. The characteristics of the human subject in images used for training may be applied to the reconstructed video frames—even when a different human subject appears in the captured images used to generate the appearance vector. Attributes of the reconstructed human subject, such as hairstyle, clothing, and/or lighting may be provided with the appearance vector or with the replication data). The apparent gaze of the reconstructed human subject(s) may be controlled, for example based on the viewer gaze direction or relative position of images of participants displayed during a videoconferencing session.

Transmitting the low-bandwidth appearance vectors to reconstruct the images at remote client devices reduces the bandwidth needed to provide the performance needed for an interactive videoconferencing experience. Temporal up-sampling may be used to generate additional frames by interpolating between different appearance vectors. Conventional compression techniques may be applied to the appearance vector and/or background image. Audio data may be transmitted and used to assist reconstruction of the video frames.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   obtaining learned data for replicating a style specific to a subject;
   configuring a neural network to apply the learned data to images processed by the neural network to modify at least one attribute according to the style specific to the subject;
   receiving, through a network, a vector generated by a remote encoder that represents attributes of an image; and
   processing, by the neural network, the vector to reconstruct the image with at least one of the attributes that is modified based on the style to produce a reconstructed image.

2. The computer-implemented method of claim 1, wherein the image includes an object and the processing reconstructs the image including the object having at least one attribute modified based on the style.

3. The computer-implemented method of claim 1, wherein the image includes an object that is blurry and the processing reconstructs the image with the object clearly defined by using the vector to control coarse scale styles and the learned data to control fine scale styles.

4. The computer-implemented method of claim 1, wherein the subject is a real or synthetic human subject, avatar, or character.

5. The computer-implemented method of claim 1, wherein the vector is a compressed encoding of the image.

6. The computer-implemented method of claim 1, wherein the learned data is determined by training a generator neural network to produce predicted images of the subject that are compared with captured images of the subject.

7. The computer-implemented method of claim 1, further comprising displaying the reconstructed image of the object in a viewing environment, wherein the neural network produces the reconstructed image according to lighting in the viewing environment instead of different lighting associated with the image and that is encoded in the vector.

8. The computer-implemented method of claim 1, wherein the vector is computed by transforming landmark points that delineate positions of key points on the object according to a learned or optimized matrix.

9. The computer-implemented method of claim 1, further comprising interpolating a first vector and a second vector corresponding to two frames in a video to produce the vector, wherein the image is between the two frames.

10. The computer-implemented method of claim 1, further comprising receiving audio data, wherein the audio data is used to produce the reconstructed image.

11. The computer-implemented method of claim 1, wherein the steps of obtaining, receiving, and processing are performed on a virtual machine comprising a portion of a graphics processing unit.

12. The computer-implemented method of claim 1, wherein the image is used for training, testing, or certifying a neural network employed in a machine, robot, or autonomous vehicle.

13. A system, comprising a processor configured to:
obtain learned data for replicating a style specific to a subject; and
implement a neural network that is configured to apply the learned data to images to modify at least one attribute according to the style specific to the subject, wherein the neural network:
receives, through a network, a vector generated by a remote encoder that represents attributes of an image; and
processes the vector to reconstruct the image with at least one of the attributes that is modified based on the style to produce a reconstructed image.

14. The system of claim 13, wherein the image includes an object and processing the vector reconstructs the image including the object having at least one attribute modified based on the style.

15. The system of claim 13, wherein the image includes an object that is blurry and processing the vector reconstructs the image with the object clearly defined by using the vector to control coarse scale styles and the learned data to control fine scale styles.

16. The system of claim 13, wherein the subject is a real or synthetic human subject, avatar, or character.

17. The system of claim 13, wherein the vector is a compressed encoding of the image.

18. A non-transitory, computer-readable storage medium storing instructions that, when executed by a processing unit, cause the processing unit to:
obtain learned data for replicating a style specific to a subject; and
implement a neural network that is configured to apply the learned data to images to modify at least one attribute according to the style specific to the subject, wherein the neural network:
receives, through a network, a vector generated by a remote encoder that represents attributes of an image; and
processes the vector to reconstruct the image with at least one of the attributes that is modified based on the style to produce a reconstructed image.

19. The non-transitory, computer-readable storage medium of claim 18, wherein the image includes an object and processing the vector reconstructs the image including the object having at least one attribute modified based on the style.

20. The non-transitory, computer-readable storage medium of claim 18, wherein the image includes an object that is blurry and processing the vector reconstructs the image with the object clearly defined by using the vector to control coarse styles and the data to control fine styles.

* * * * *